United States Patent [19]
Crandall et al.

[11] Patent Number: 4,873,703
[45] Date of Patent: Oct. 10, 1989

[54] SYNCHRONIZING SYSTEM

[75] Inventors: Douglas Crandall, Berkeley; Vicente Cavanna, Loomis; Pradip Shankar, Citrus Heights, all of Calif.; Rasmus Nordby, Horsholm, Denmark

[73] Assignee: Hewlett-Packard Company, Palo Alto, Calif.

[21] Appl. No.: 235,746

[22] Filed: Aug. 19, 1988

Related U.S. Application Data

[63] Continuation-in-part of Ser. No. 11,352, Jan. 30, 1987, abandoned, which is a continuation-in-part of Ser. No. 781,868, Sep. 27, 1985, abandoned.

[51] Int. Cl.[4] .............................................. H04L 7/00
[52] U.S. Cl. .................................... 375/118; 375/106; 375/107
[58] Field of Search ................ 375/106, 107, 109, 118

[56] References Cited

U.S. PATENT DOCUMENTS 4,320,515  3/1982  Burton, Jr. .............................. 375/4

OTHER PUBLICATIONS

"General Theory of Mestable Operation", Leonard R. Mariono, IEEE Transactions on Computers, vol. c-30, No. 2, Feb. 1981, pp. 107-115.
"Anomalous Behavior of Synchronizer and Arbiter Circuits", Thomas J. Chaney, Charles E. Molnar, IEEE Transactions on Computers, Apr. 1973, pp. 421-422.
"Circuit Technology in a Large Computer System", D. J. Kinniment, D. B. G. Edwards, The Radio and Electronic Engineer, vol. 43, No. 7, Jul. 1973.

Primary Examiner—John W. Shepperd
Assistant Examiner—Michael D. Parker

[57] ABSTRACT

A synchronizing system is provided for reliably passing data across a boundary between two independent, non-correlated clocks, referred to as the receiving and transmitting clocks. The system reduces occurrence of errors due to asynchronous samplings to an arbitrarily low level based on metastable operation. The system is organized as a two port memory with unit distance code addressing the memory cells. It performs a handshake between the two non-correlated clock systems to allow for any ratio between the two clocks.

24 Claims, 26 Drawing Sheets

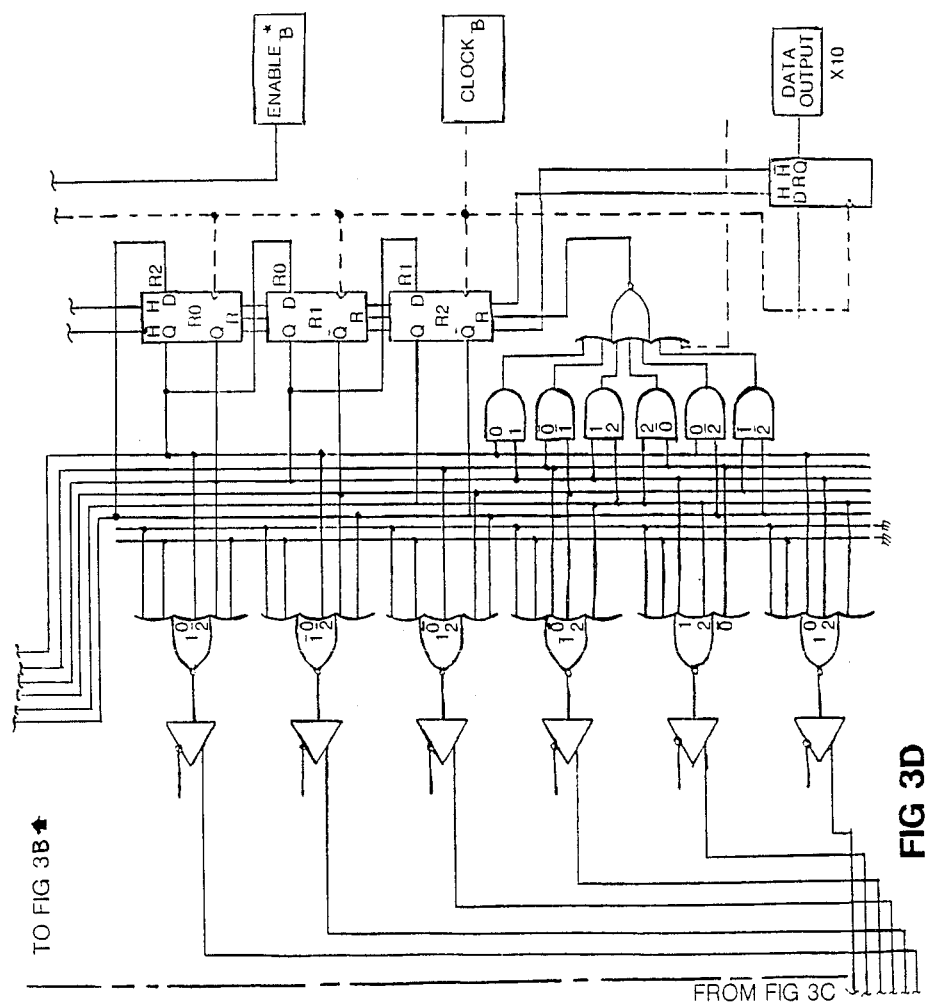

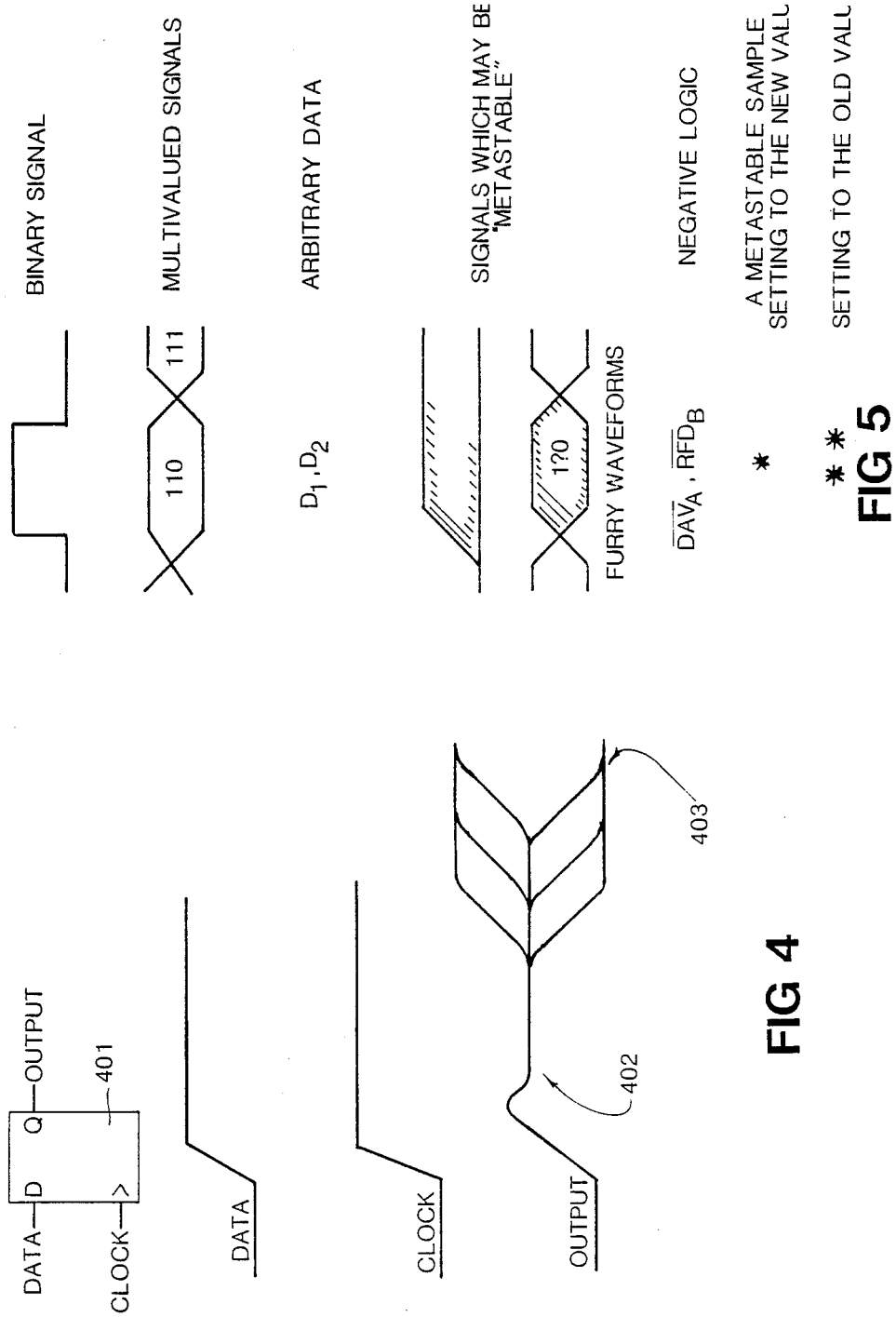

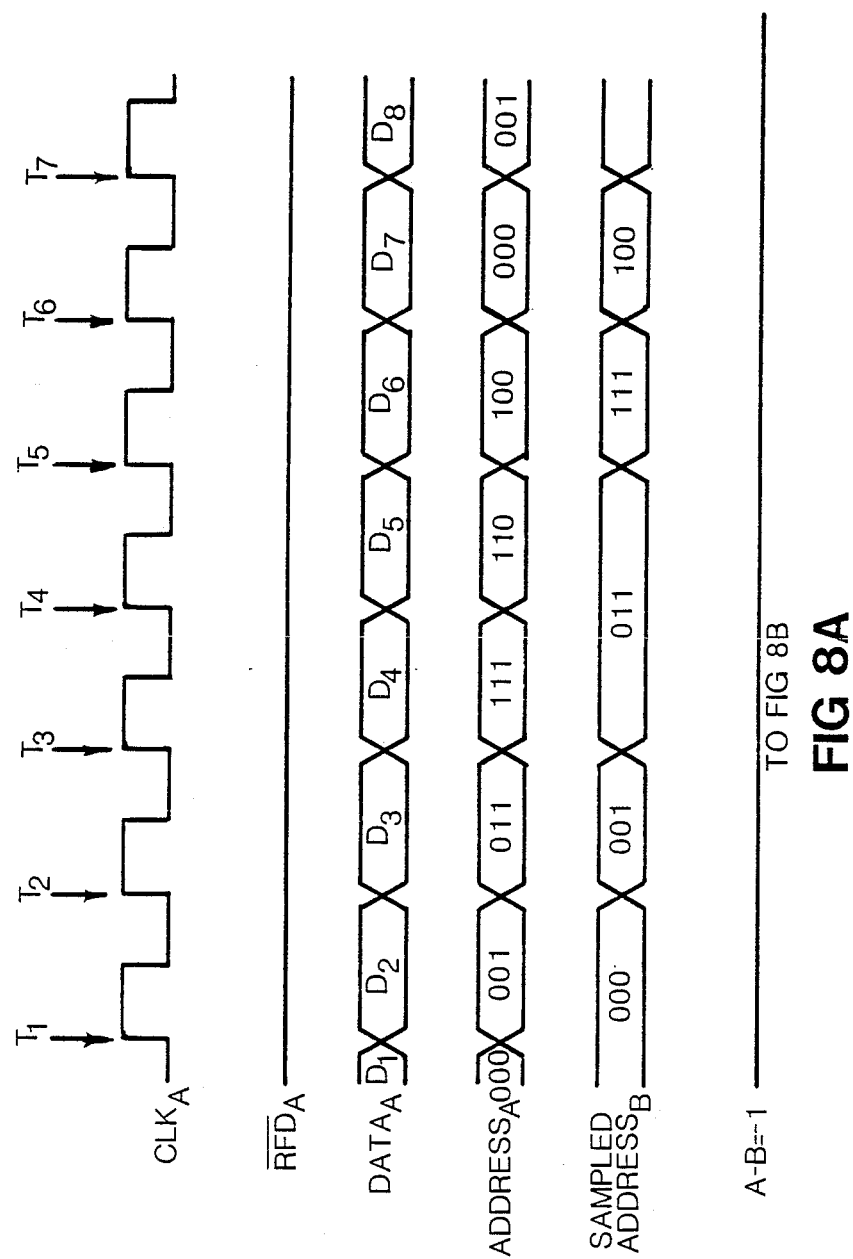

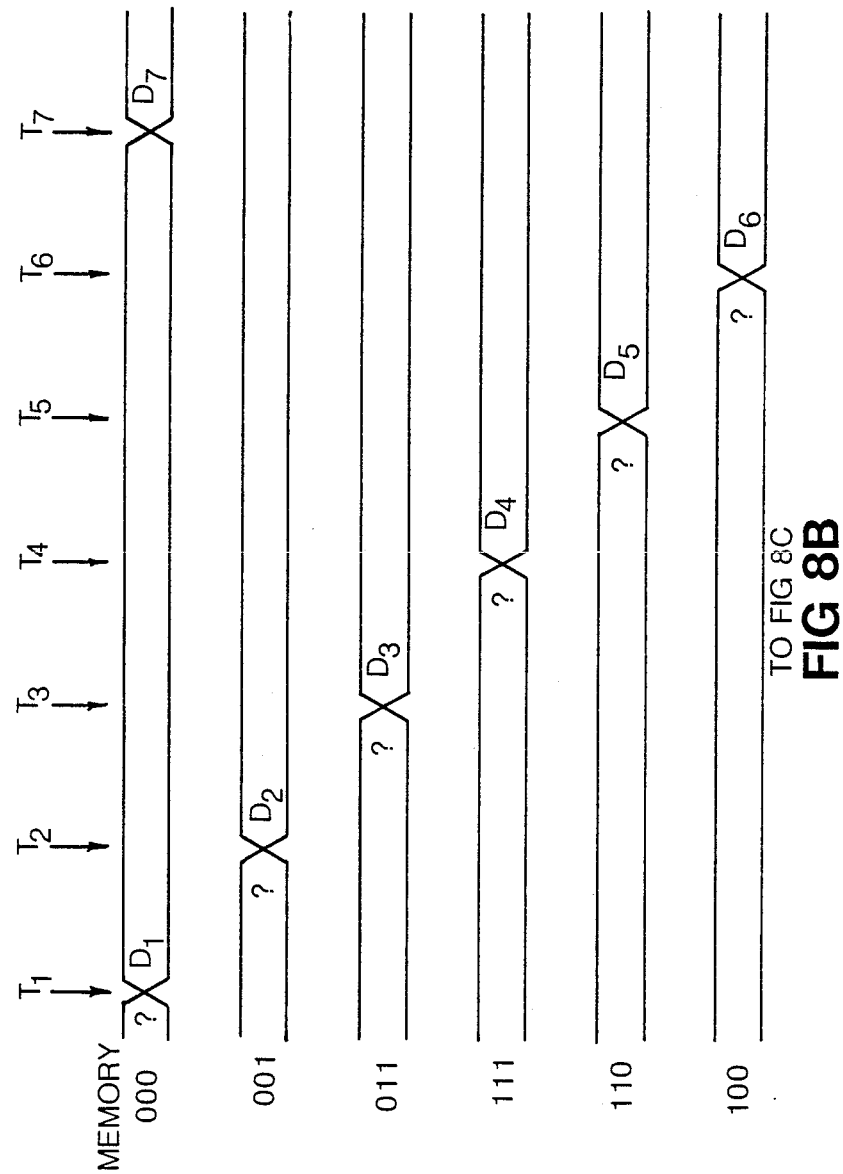

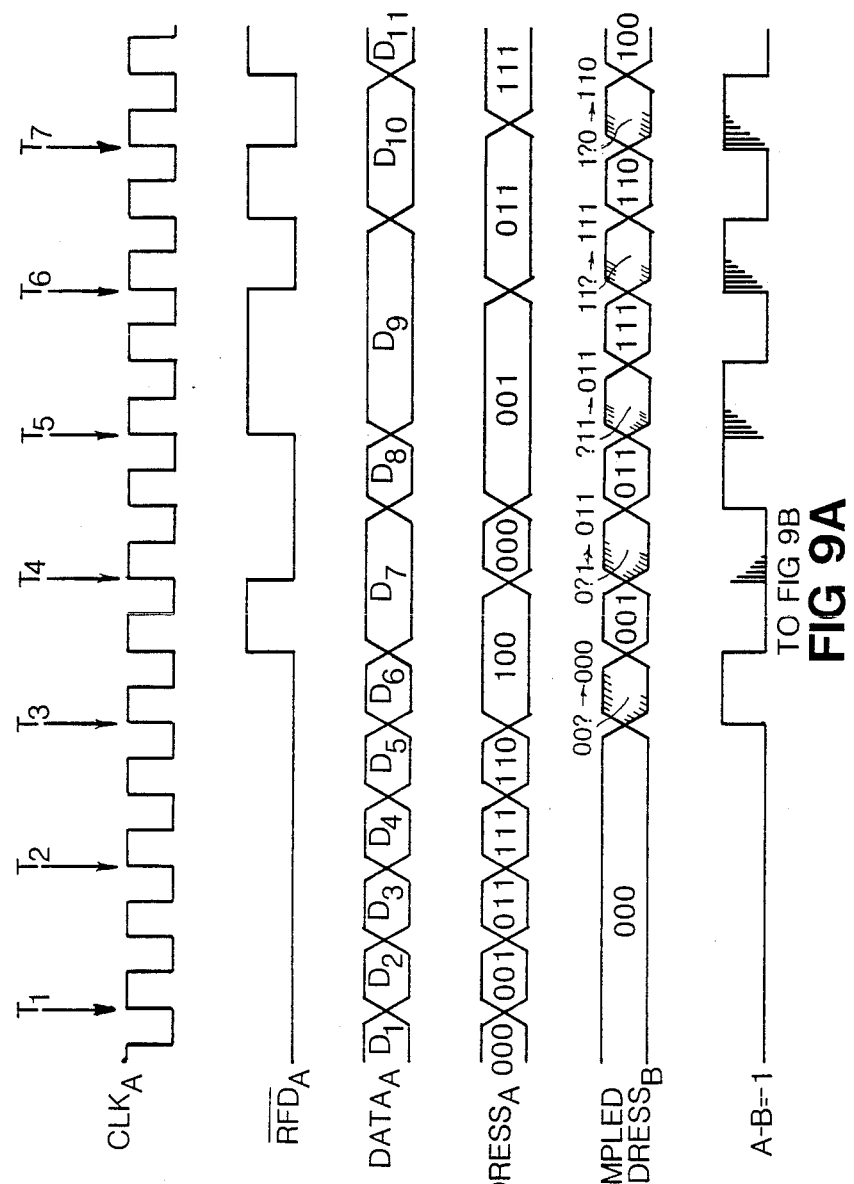

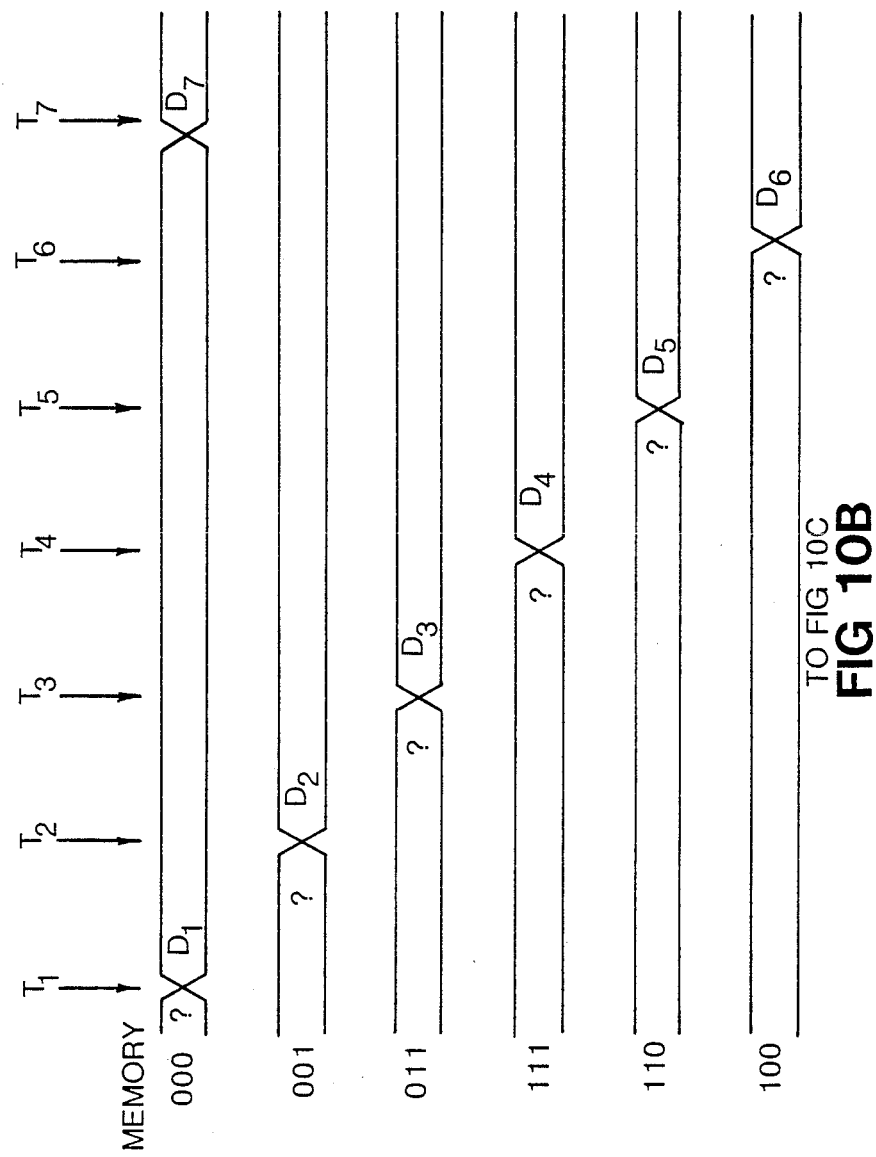

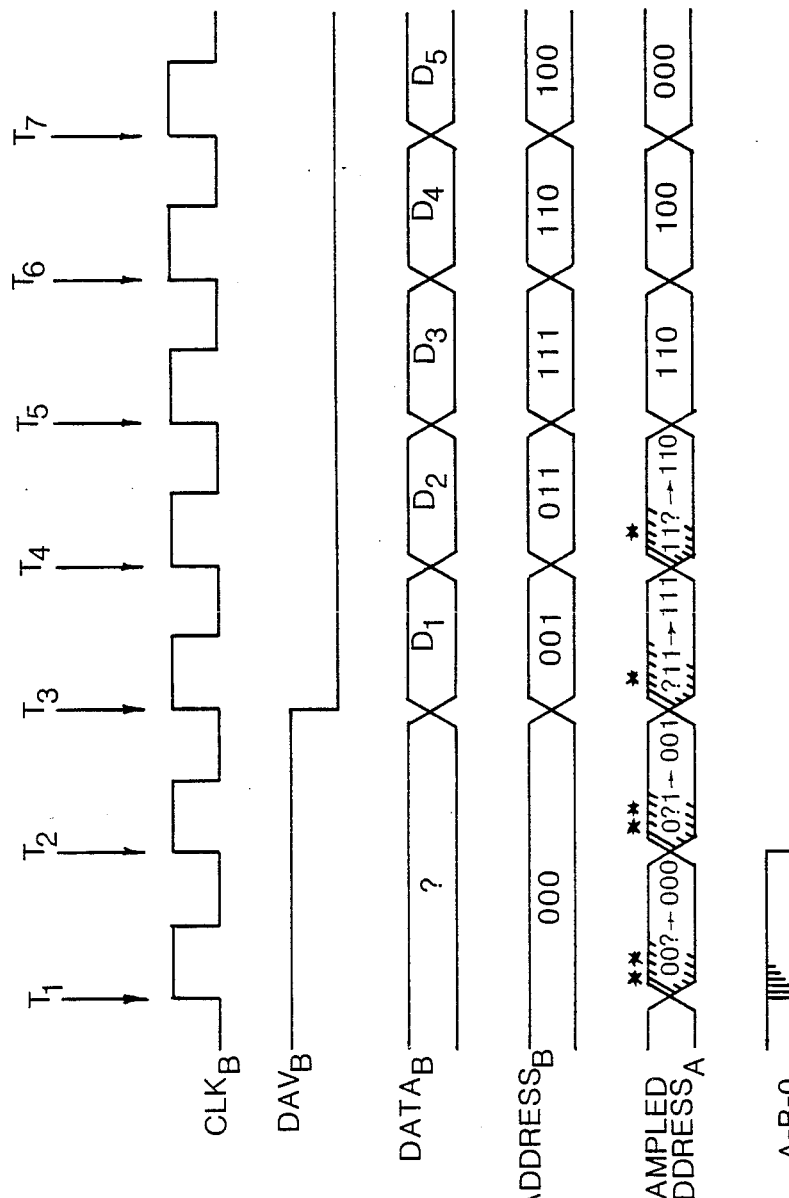

NOTATION:

THE STATE VARIABLES:

| | |
|---|---|
| RFDw | TRUE WHEN READY FOR DATA FROM SOURCE |
| W | THE WRITE POINTER |
| R*[0:Nw-2] | NW-1 STAGES OF SYNCHRONIZED READ POINTER |
| DAVr | TRUE WHEN DATA AVAILABLE FOR SINK |
| R | THE READ POINTER |
| W*[0:Nr-2] | Nr-1 STAGES OF SYNCHRONIZED WRITE POINTER |
| R_ARRAY[0:N-1] | ARRAY OF N DATA DATA REGISTERS |

THE INPUTS:

| | |
|---|---|
| RFDr | TRUE WHEN SINK IS READY FOR DATA |
| DAVw | TRUE WHEN SOURCE HAS DATA AVAILABLE |

COMPOSITE SIGNALS:

| | |
|---|---|
| WRTNG | TRUE WHEN SOURCE IS WRITING |
| RDNG | TRUE WHEN SOURCE IS READING |

*FIG 11A*

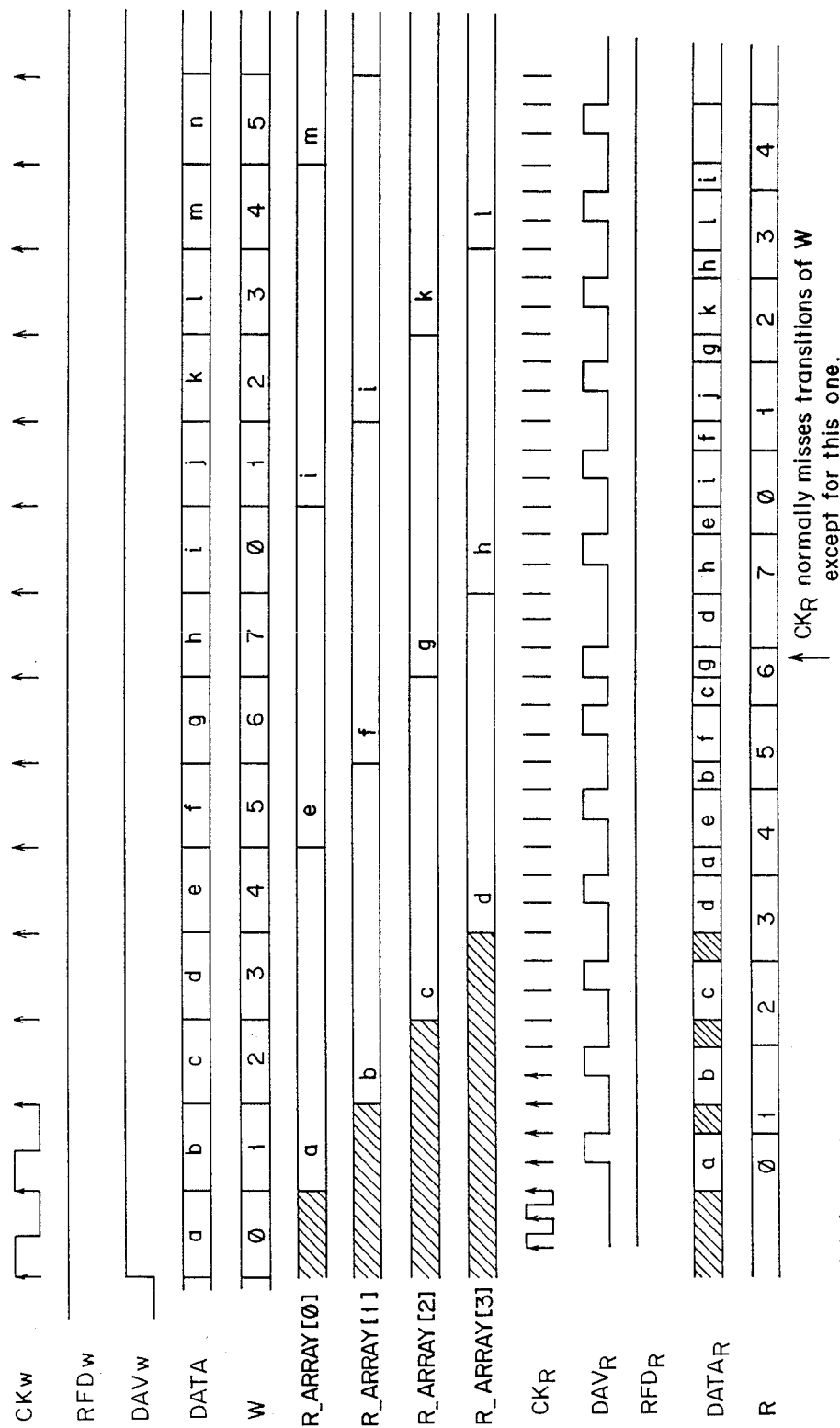

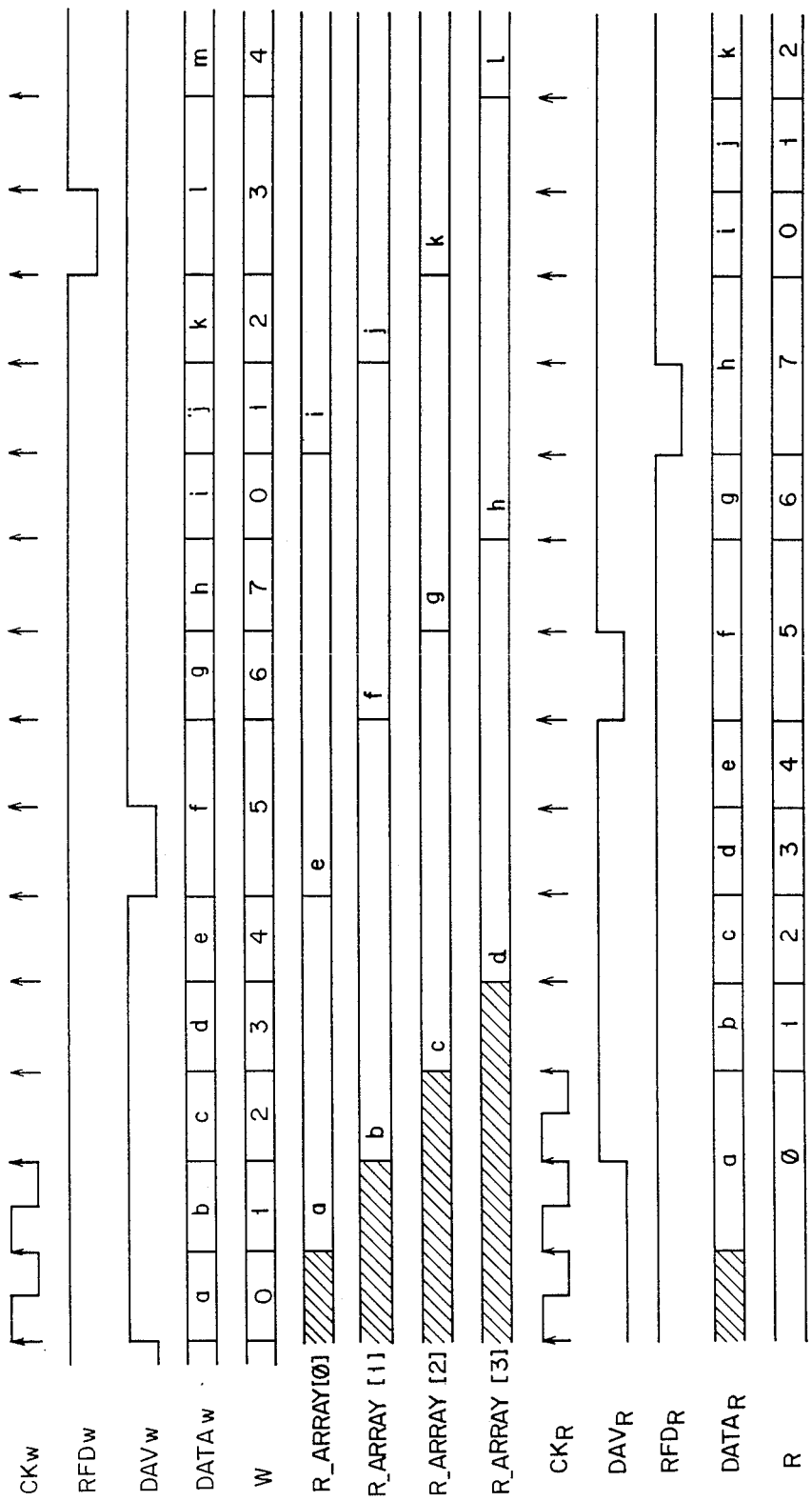

SYNCHRONIZING SYSTEM

CROSS REFERENCE TO RELATED APPLICATION

This application is a continuation-in-part of application Ser. No. 07/011,352, filed 1/30/87 which is a continuation-in-part of Ser. No. 06/781,868 filed 9/27/85, now both abandoned.

BACKGROUND OF THE INVENTION

The present invention relates to a synchronizing system, and more particularly relates to means used between two devices transmitting data at different speeds to counteract this differential as a buffer.

In any circuit interfacing two non-correlated and asynchronous clocks, there will exist a non-zero probability of sampling a signal from one system with the clock from the other system while the signal is changing. The result of such a sampling, where set-up and hold times are not met, may be an erroneous output. Unpredictably the output can be logic "1", logic "0" or in a "metastable state" between "1" and "0". This undefined logic state may be interpreted differently by different receiving devices, and in a general configuration it is able to propagate through the succeeding logic gates.

This "metastable state" is discussed in the articles, "General Theory of Metastable Operation" by Leonard R. Marino, P107-P115, IEEE TRANSACTIONS ON COMPUTERS, Vol. C.30, NO.2, February, 1981, "Anomalous Behavior of Synchronizer and Arbiter Circuits" by Thomas J. Chaney et al, P421-P422, IEEE TRANSACTIONS ON COMPUTERS, Correspondence, April, 1973, and "Circuit Technology in a large computer system" by D. J. Kinniment et al, P435-P441, THE RADIO AND ELECTRONIC ENGINEER, Vol. 43, No.7, July, 1973. The metastable state is potentially unstable and the probability that the output will stay in metastable state decays exponentially with time. All logic families exhibit the metastable operation, when sampling occurs on a transition. However, families with a high-gain bandwidth product are less inclined to exhibit the metastable state than those with a low-gain bandwidth product. The metastable problem is a fundamental problem in digital circuits interfacing asynchronous clocks, and there exists no exact solution to avoid errors. However, the probability of inducing errors due to the metastable operation can be reduced by allowing longer time for the output to settle from the metastable state and by employing high-gain bandwidth product devices.

SUMMARY OF THE INVENTION

In accordance with a first embodiment of the present invention, there is provided a synchronizing system. The purpose of the synchronizing system is to reliably pass data across a boundary between two independent, non-correlated clocks, referred to as the receiving and transmitting clocks. Thus, the task is to minimize the occurrence of errors caused by asynchronous samplings. Data is being supplied to the synchronizer synchronously with the receiving clock and is transmitted to the receiver with a minimal delay from the synchronizer synchronously with the transmitting clock.

This synchronizer transfers data bytes sourced at one clock rate to a data sink which removes them at another clock rate. The two clock frequencies can have arbitrary phase and frequency relationship, i.e. asynchronous, faster or slower. It also performs a handshake at the input and output sides synchronous with the input clock and output clock respectively.

The synchronizer uses a memory-like circuit consisting, for example, of a RAM with address logic allowing for independent read and write access to the RAM. The circuit is optimized to minimize the error rate when the read and the write clocks are asynchronous. Error free transfer through the synchronizer occurs whenever metastable states generated by asynchronous samplings have settled to an arbitrary valid logic level, i.e. one or zero, within one clock cycle. The read and write clocks can be synchronous or asynchronous and they can be periodic or aperiodic. Furthermore, a low level synchronous handshake is implemented on each side of the synchronizer and allows for use of fill characters when no data is available and for data source hold-off when data overflow would otherwise occur. Independent enable lines on sink and source side of the synchronizer can be used to place the outputs on each side in a high impedance state.

BRIEF DESCRIPTION OF THE DRAWINGS

FIGS. 3, 3A–3D show a circuit diagram of the synchronizer describing the detailed circuit configuration of the functional block diagram shown in FIGS. 2A–B.

FIG. 4 is an illustration of the metastable state in a flip-flop used for the synchronizer as shown in FIG. 3.

FIG. 5 is an illustration of the conventions used in the following timing charts.

FIGS. 8, 8A–8C show a timing chart of the synchronizing system as shown in FIG. 1 in cases where clock signal A is two times slower than clock signal B.

FIGS. 9, 9A–9C show a timing chart of the synchronizing system as shown in FIG. 1 in cases where clock signal A is two times faster than clock signal B.

FIGS. 10, 10A–10C show a timing chart of the synchronizing system as shown in FIG. 1 in cases where clock signal A is the same as clock signal B.

FIG. 11a is a tabulation of the signal definitions for the signals shown in the various Figures.

FIG. 14 is a waveform diagram showing operation wherein the sink system clock is faster than the source system clock.

FIG. 15 is a waveform diagram showing the operation wherein the sink system clock has the same frequency as the source system clock.

Other features and advantages of the present invention will become apparent upon consideration of the following detailed description and the accompanying drawings, in which like reference designations represent like features throughout the Figures.

DESCRIPTION OF THE PREFERRED EMBODIMENT

Figure 1:
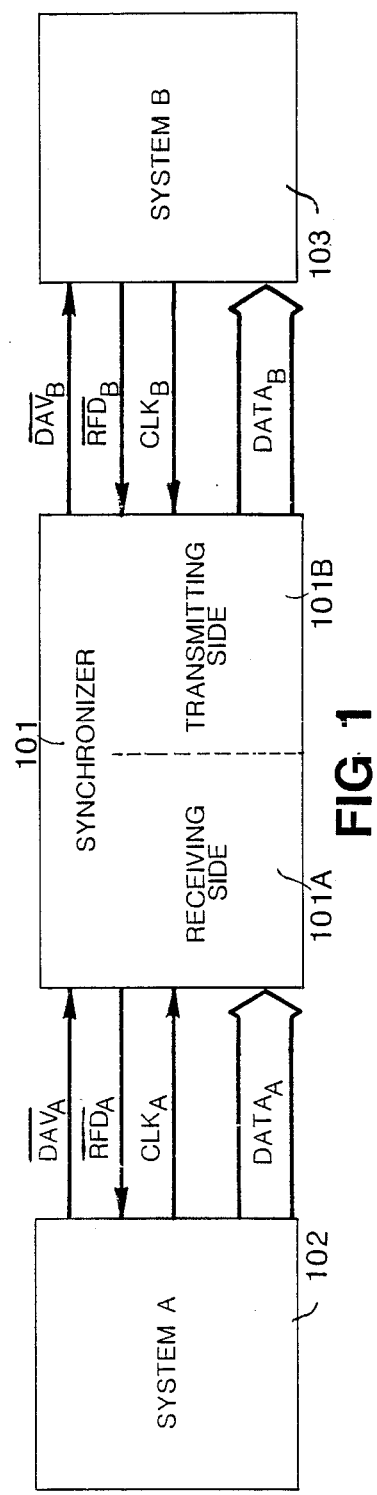
FIG. 1 is a system block diagram of a first embodiment of the present invention describing the system configuration of a system A, a system B, and a synchronizer.
Figure 3:
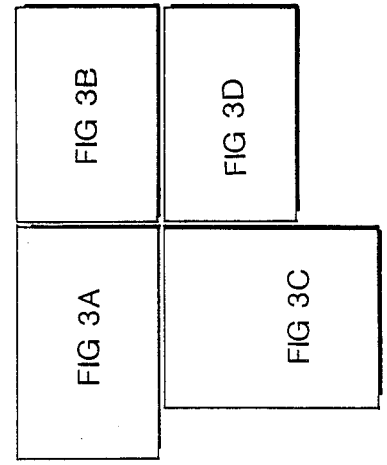

In FIG. 1, a synchronizing system is shown as a system configuration. In the embodiment of the invention, the synchronizing system consists of a synchronizer 101 having a receiving side 101A coupled to a system A 102 and a transmitting side 101B coupled to a system B 103. The coupling of the synchronizer 101 to the system A 102 and the system B 103 is performed by a synchronous and interlocked handshake. It is synchronous because all lines in the interface are synchronous with the transfer clock frequency. It is used on the input and output side of the synchronizer circuit in which case the synchronizer translates one synchronous handshake into a similar handshake synchronous with an arbitrary second clock. Data (DATA) is transferred in bytes of any width at the rate of a clock signal (CLK). Each data byte is labelled with a "data available" signal (DAV). For each clock cycle the data sink presents a "ready for data" signal (RFD).

Figure 2:
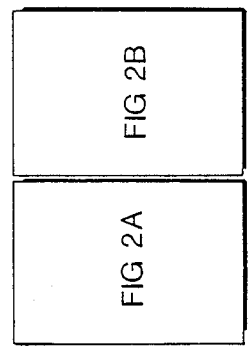
FIGS. 2, 2A–2B show a functional block diagram of the synchronizer as used in FIG. 1 employing a two port memory with address logic circuit.
Figure 2A:
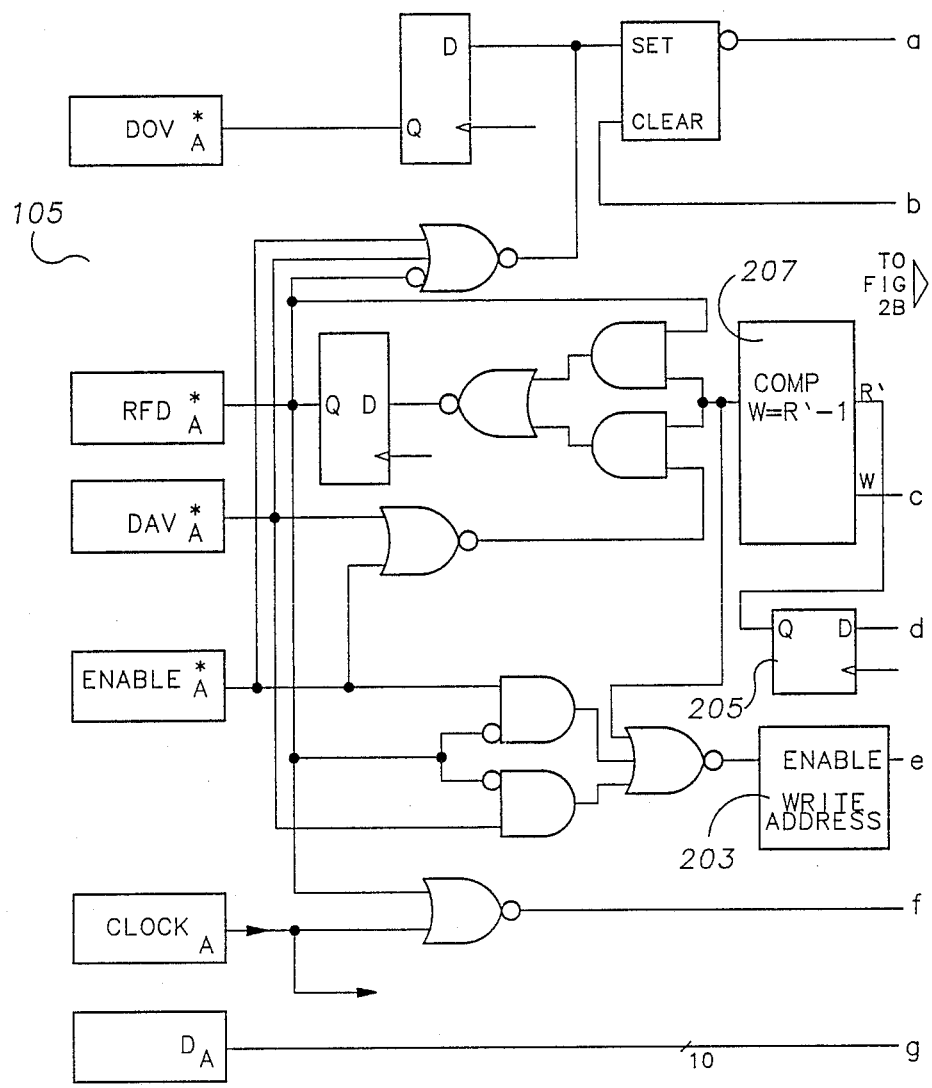
Figure 2B:
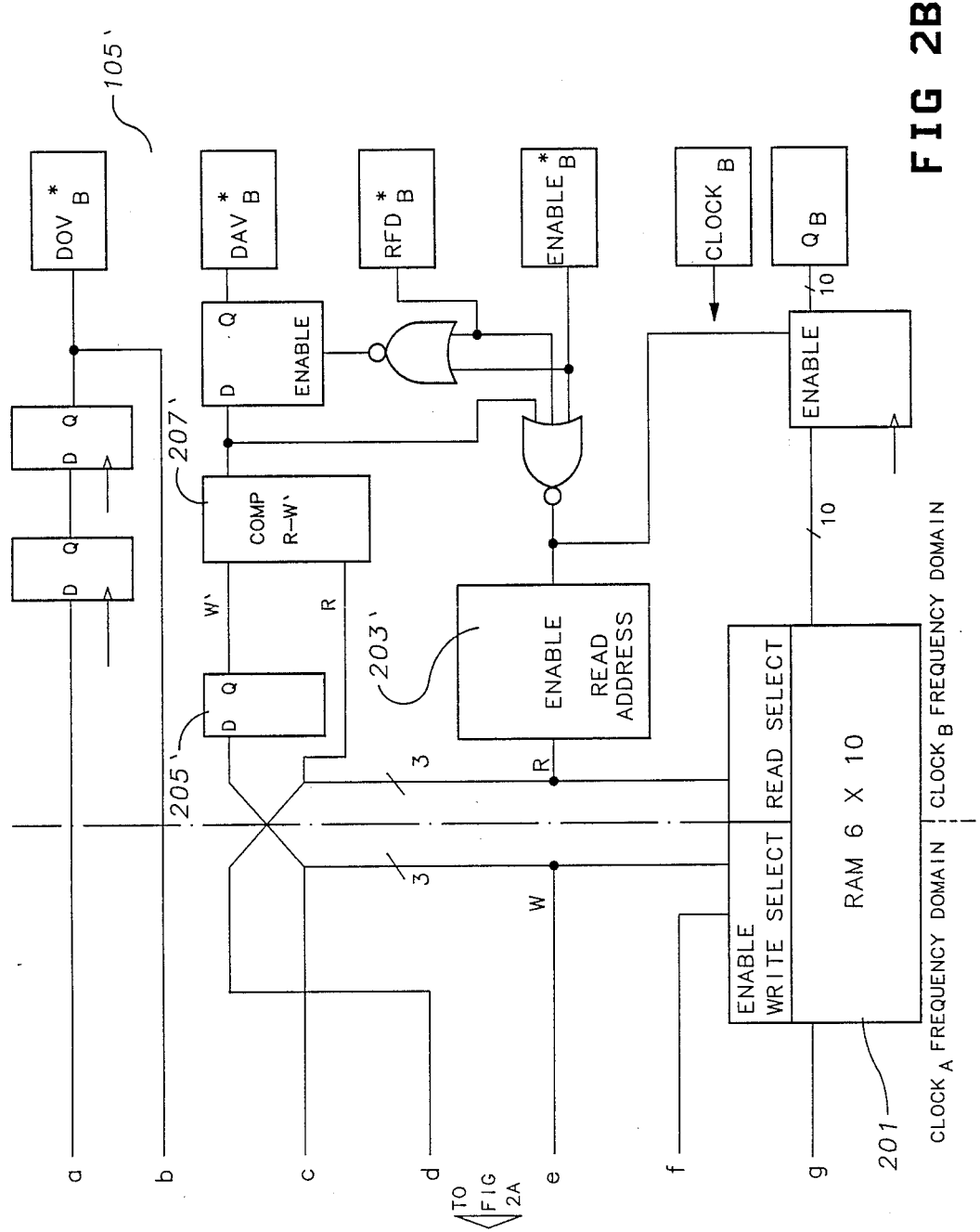
Figure 3A:
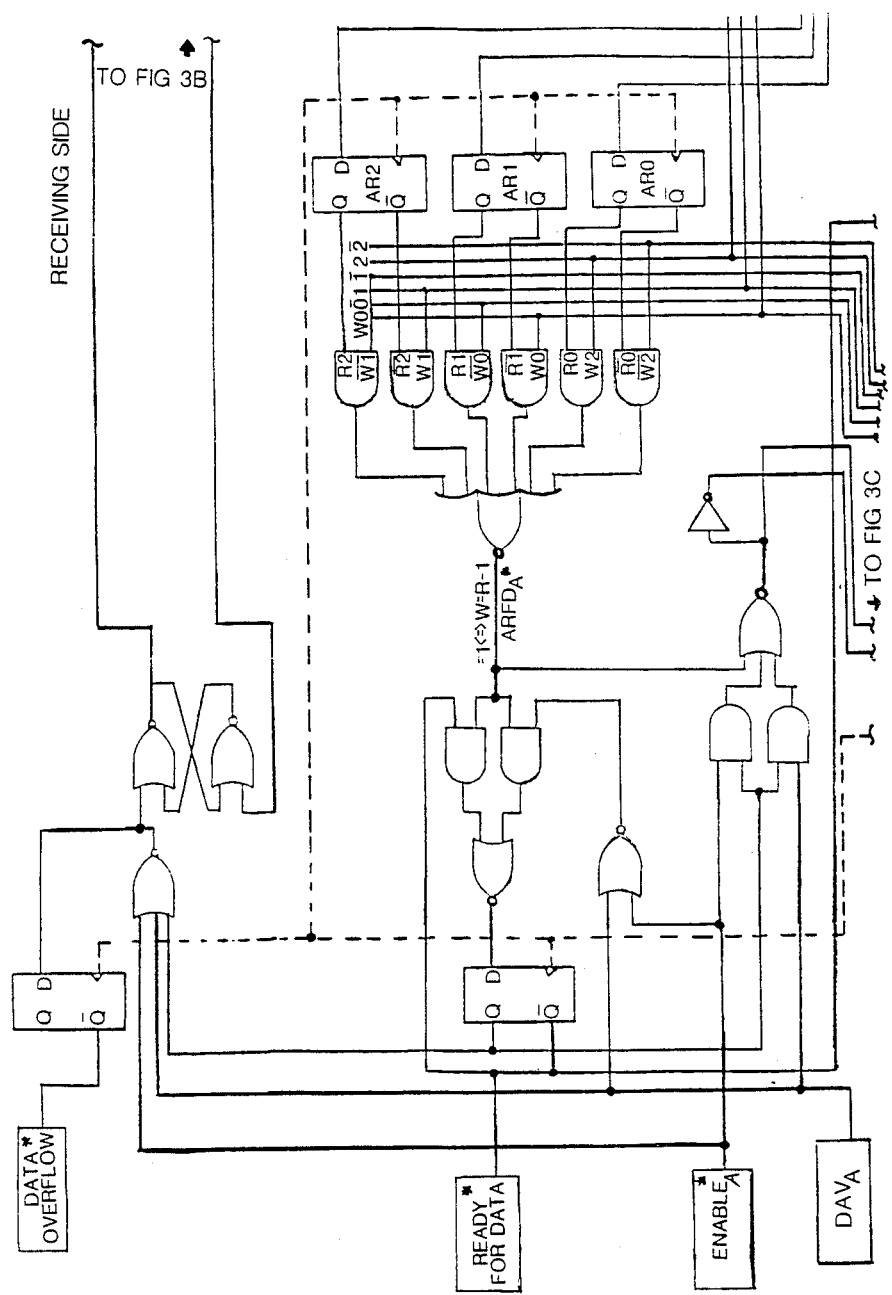
Figure 3B:
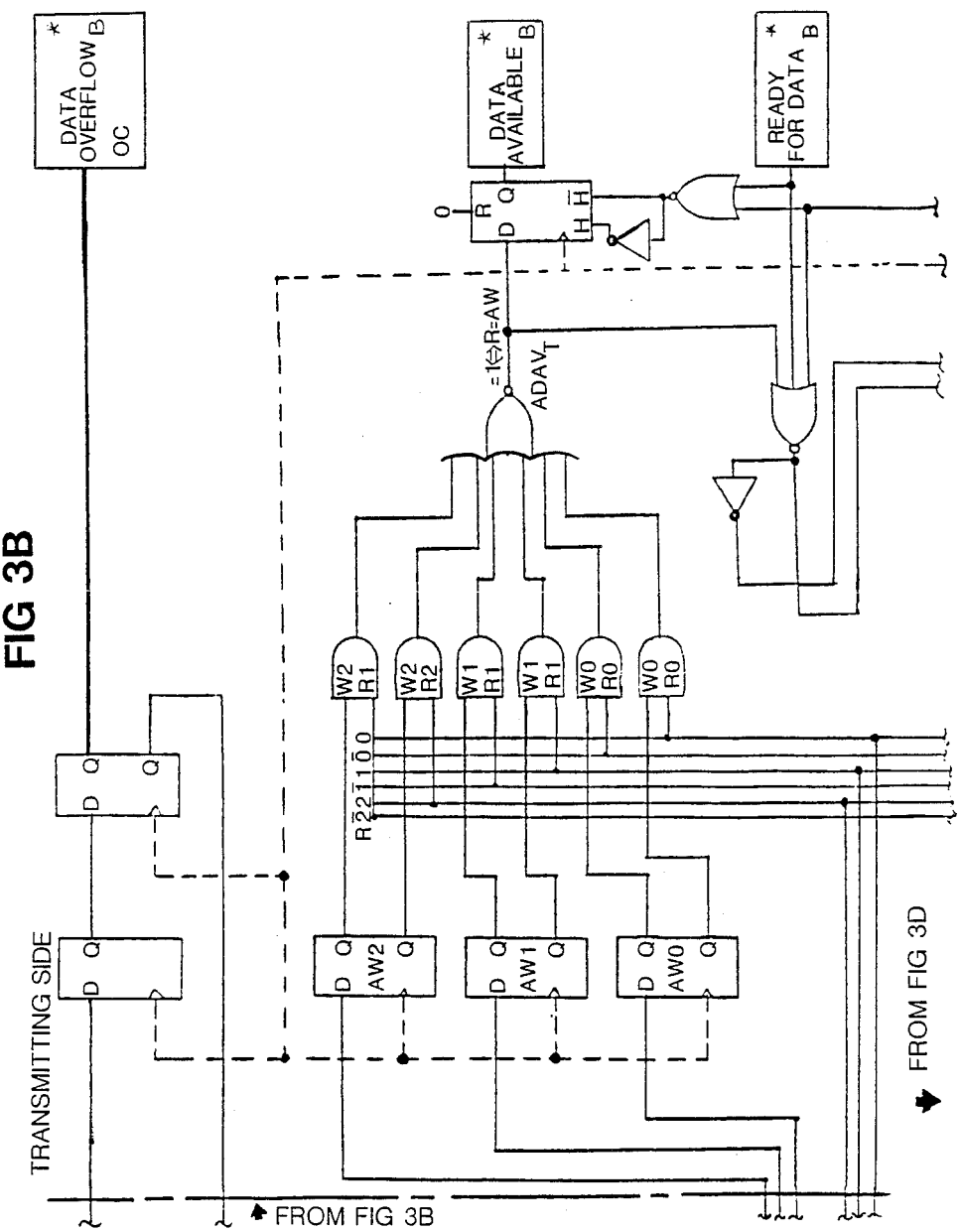
Figure 3C:
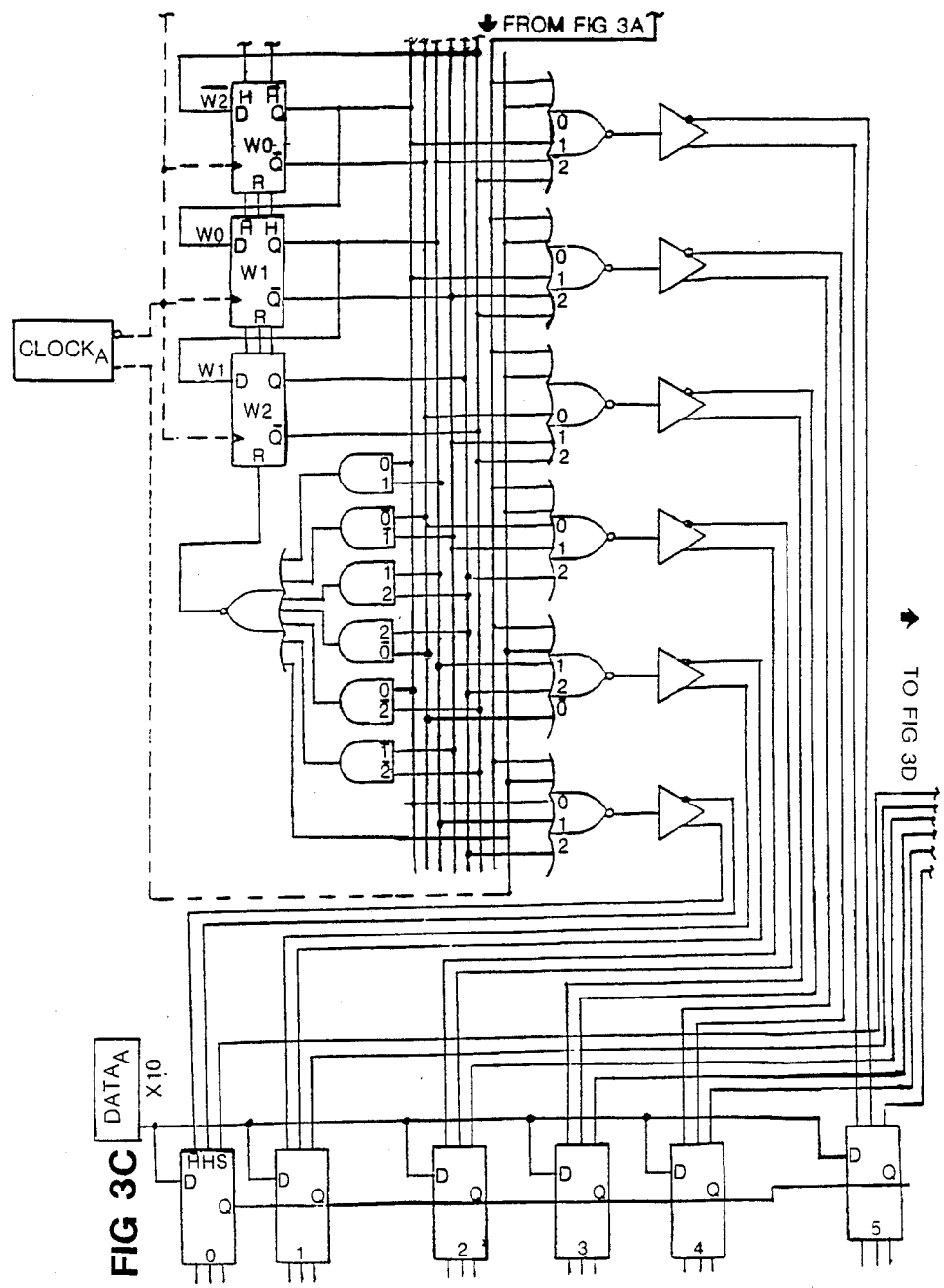
Figure 11:
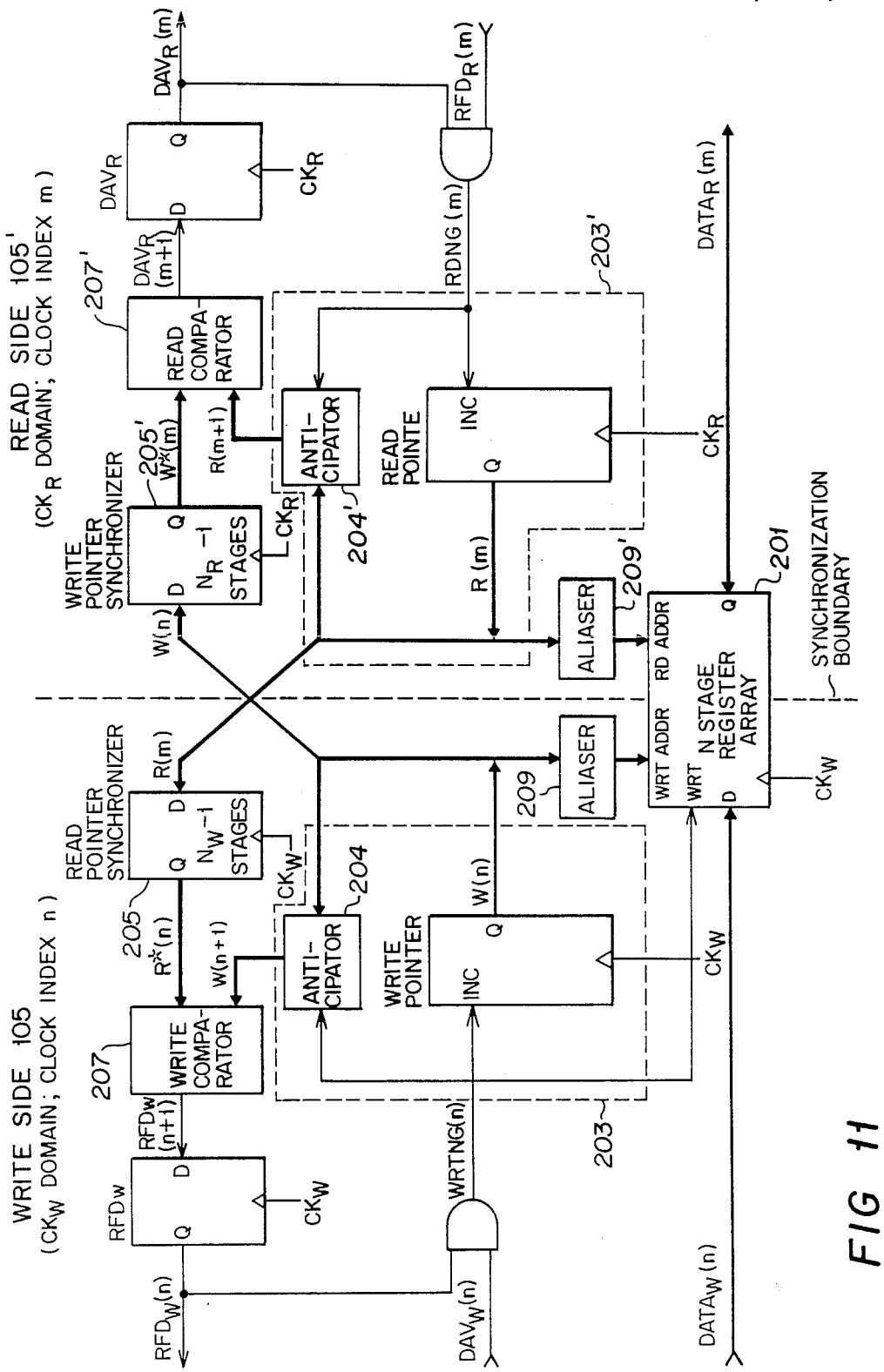
FIG. 11 is a schematic system block diagram of a second embodiment of the present invention.

In FIGS. 2A-B, a first embodiment of the synchronizer 101 is explained in more detail as a functional block diagram. In FIG. 11, a second embodiment of the synchronizer 101 is shown in a more detailed functional block diagram. A general description of the first embodiment is now described in general in order to disclose the functionality of the invention. A more detailed description of the individual circuit block components is set forth below with respect to the embodiment of FIG. 11. The synchronizer 101 is organized as a two port memory 201 with a write address controlled by the receiving clock signal CLK A and the handshake lines on the receiving side and a read address controlled by the transmitting clock CLK B and the handshake lines on the transmitting side. By addressing the two port memory cells in a unit distance code which results in only one bit changing each time it advances to the next state, an important feature for asynchronous operation is obtained. Namely, the address control logic can be designed for asynchronous operation so that the outcome of the asynchronous sampling is no longer important. The only requirement for error free transfer is that the asynchronous sampling has settled to a valid logic one or zero level in whatever time the control logic allows for metastable settling. With 6 bits depth of the two port memory, one clock period is allowed for metastable settling. If for a given logic family this introduces a non-satisfactory error rate, the circuit architecture allows for arbitrarily long metastable settling time, i.e. arbitrarily low error rate, with the expense of added depth to the two port memory and cascaded asynchronous samplings. Cascading M extra asynchronous samplings increases the through-delay by M transmitting clock cycles.

The function of the address control logic shown in FIGS. 2A-B is to determine the following three logic operations: first, whether a valid read out can be done from the two port memory and a write cycle of valid data has been completed or not; second, whether an excessive amount of data is accumulated in the two port memory and whether the next byte sent into the synchronizer can be accommodated in the two port memory or not; and third, whether a data overflow has actually occurred in the two port memory or not, in case the data source does not obey the handshake by a data overflow signal (DOV). The read and write operation will be described in more details hereafter. Writing data into the two port memory cell to which the write address is pointing is done each transmit clock cycle, if the synchronizer status is ready for data, and if valid data is available from the source. The synchronizer is considered to be ready for data when there is still one vacant cell left in the two port memory. To determine this vacancy condition, an asynchronous sampling of the read address with the receiving clock is required. The write address is advanced by one only after the completion of writing in; otherwise it is not advanced. Reading data out of the two port memory cell to which the read address is pointing is done each transmitting clock cycle, if the write operation into this cell has been completed. The write operation is considered completed if the read address does not equal the write address. This comparison involves an asynchronous sampling of the write address with the receiving clock. The read address is advanced by one only after the completion of valid reading out; otherwise it is not advanced.

Detailed design of the synchronizer system shown in the functional block diagram of FIGS. 2A-B is disclosed in FIGS. 3A-D, where the two port memory is, for example, an integrated circuit TYPE SN54170 manufactured by Texas Instruments Incorporated, and the unit distance code is a Gray code. The logic shown comprises exemplary basic circuitry for implementing the synchronizer 101 as shown in block form in FIGS. 2A-B as may be understood by reference to common texts such as Understanding Digital Electronics, copyright 1978 by Texas Instruments Inc. or Ghandhi, S.K., VLSI Fabrication Principles, copyright 1983, John Wiley & Sons, or Semiconductor & Integrated Circuit Fabrication Techniques, Reston Publishing Co., Inc., copyright 1979 by the Fairchild Corporation. As will be recognized by a person skilled in the art, this implementation is in accordance with standard engineering principles and may vary in form while providing equivalent functionality.

The synchronizing system will hereafter be more precisely explained as regards the timing of the operation. In FIG. 4, a flip-flop 401 used for the synchronizer is shown, where metastable behavior of the output of the flip-flop 401 is illustrated. When the flip-flop 401 receives data and a clock signal, the output of the flip-flop 401 remains at an invalid level for an arbitrarily long time as illustrated in FIG. 4 as part 402. When it finally resolves it may go to either high or low state, regardless of input, as illustrated in FIG. 4 as part 403.

In FIG. 5, abbreviations and conventions used for the following timing charts are shown.

Figure 6:
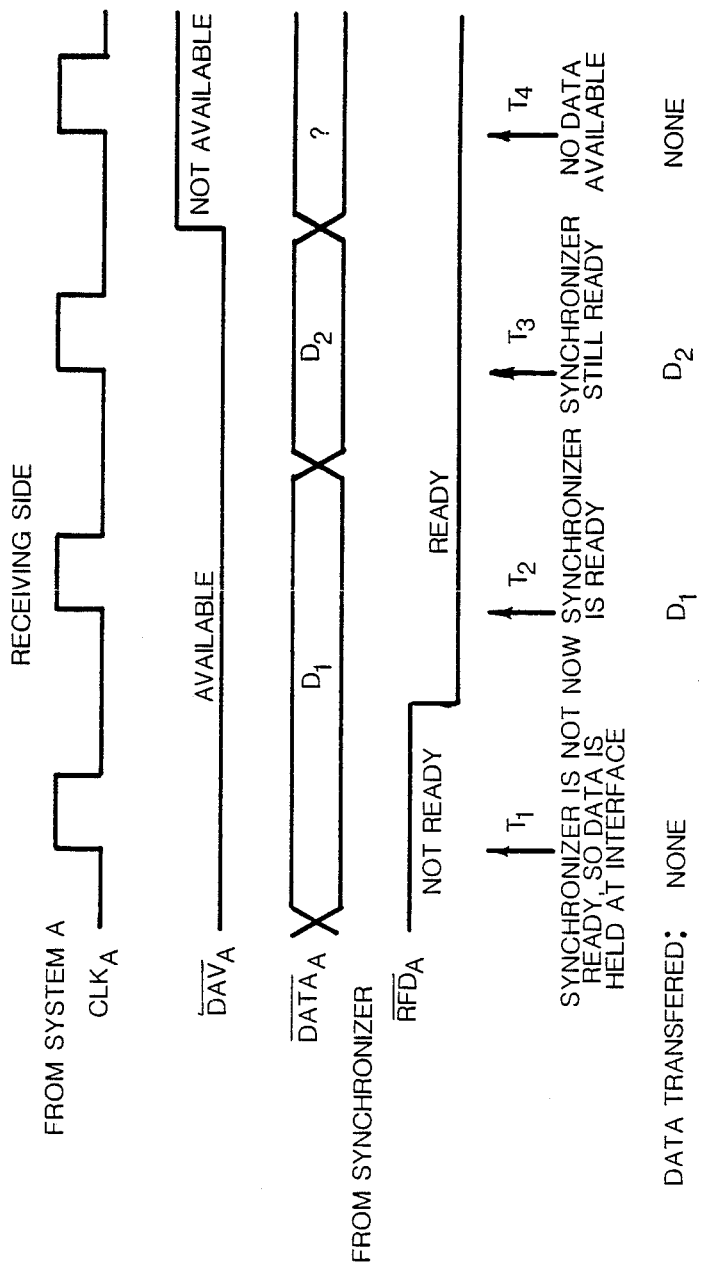
FIG. 6 is a timing chart of the receiving side of the synchronizing system as shown in FIG. 1.

In FIG. 6, the receiving side of the synchronizer receives the clock signal CLK A, the data available signal DAV A, and the data DATA A including D1 and D2 from the system A. When the synchronizer is ready for receiving the data DATA A, it provides the ready for data signal RFD A to the system A. At the time T1 the synchronizer is not ready, so the data is held at interface and the data is not received by the synchronizer. At the time T2 the synchronizer is now ready, then the data D1 is received by the synchronizer. At the time T3 the synchronizer is still ready, so the data D2 is received by the synchronizer. At the time T4 the synchronizer is still ready, but the system A is not available, therefore the data is not received by the synchronizer.

Figure 7:
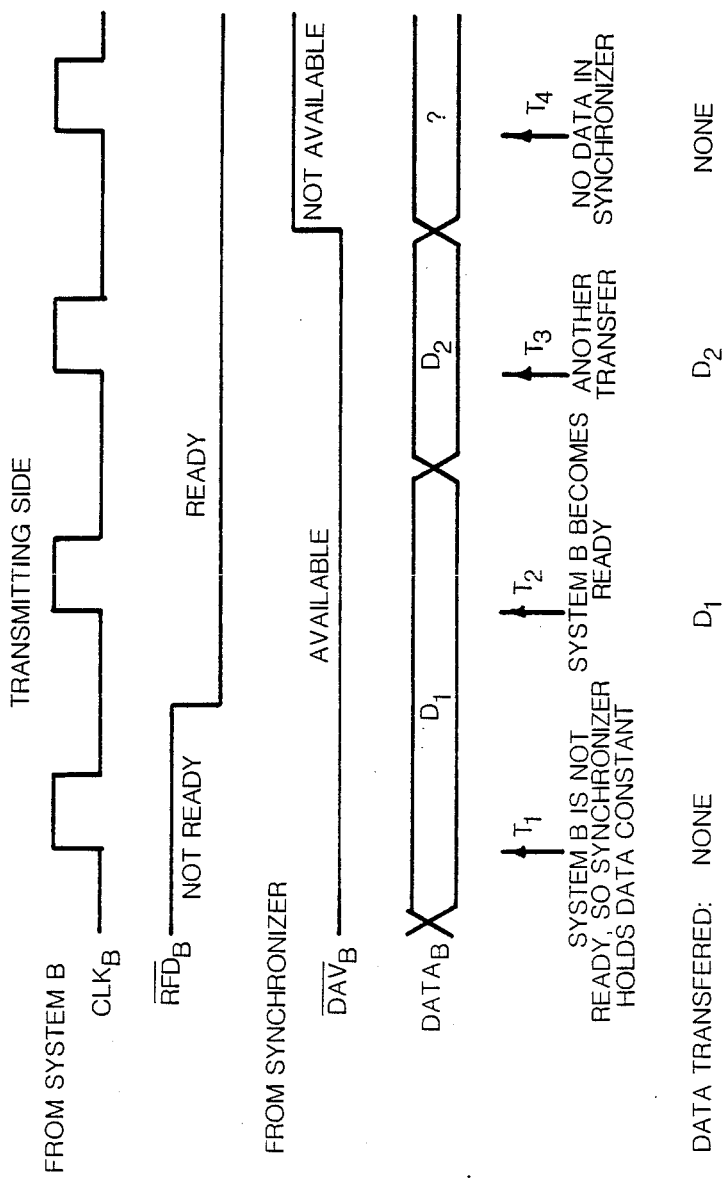
FIG. 7 is a timing chart of the transmitting side of the synchronizing system as shown in FIG. 1.

In FIG. 7, the transmitting side of the synchronizer receives the clock signal CLK B and the ready-for-data signal RFD B from the system B. When the synchronizer is available to transmit the data, it provides the data available signal DAV B and the data DATA B to the system B. At the time T1 the system B is not ready, so the synchronizer holds the data constant and the data is not transmitted by the synchronizer. At the time T2 the system B becomes ready, so the data D1 is transmitted to the system B. At the time T3 the system B is still ready, so the data D2 is transmitted to the system B. At the time T4 there is no data in the synchronizer, so no transmission occurs.

Figure 8:
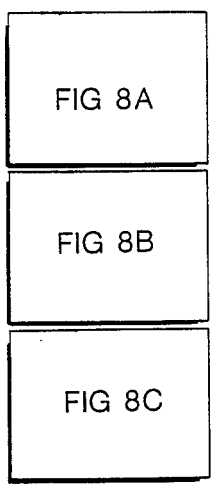
Figure 9:
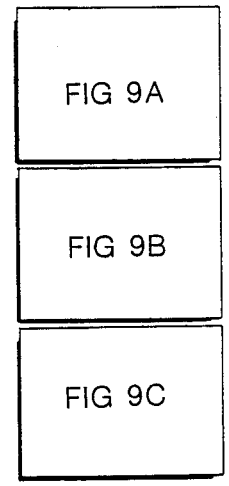
Figure 10:
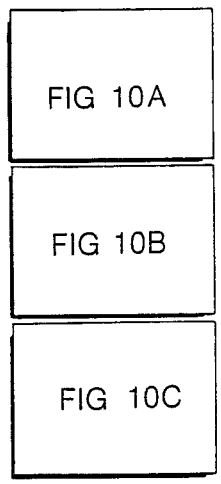
Figure 8C:
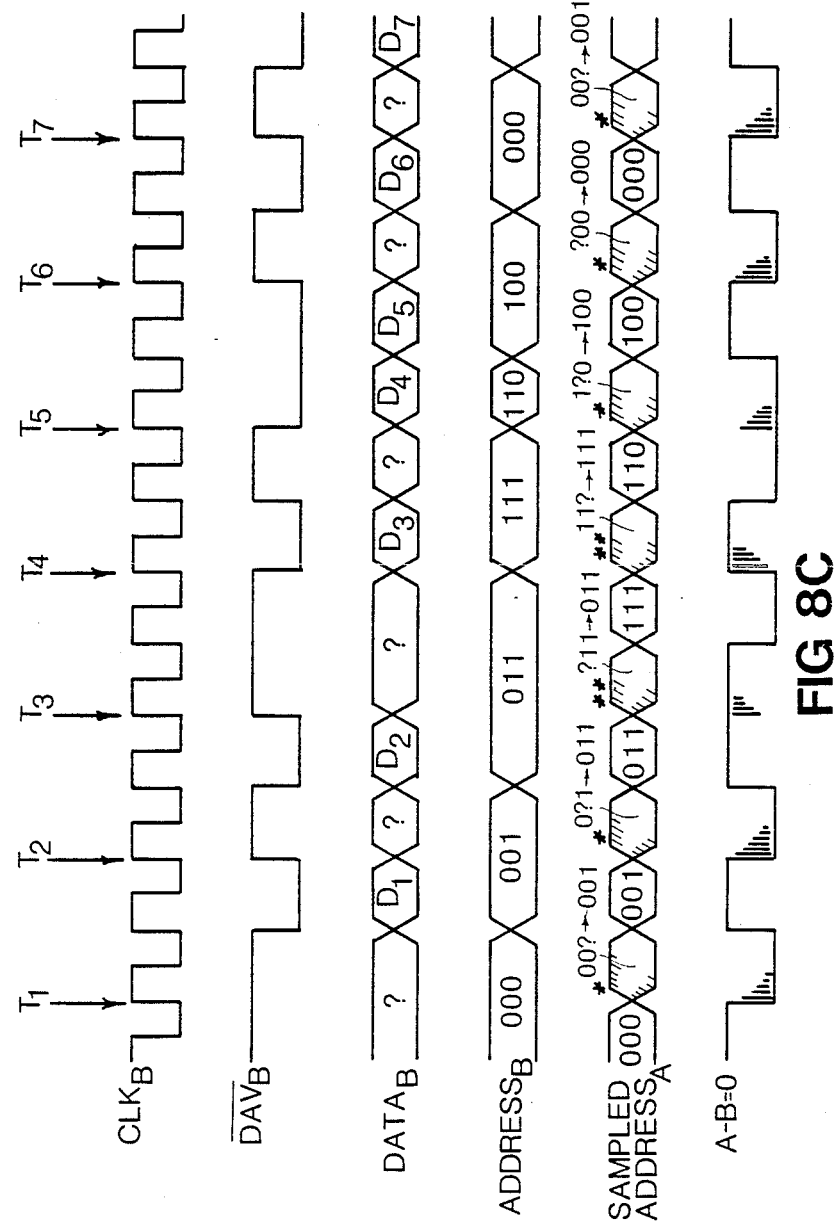
Figure 9B:
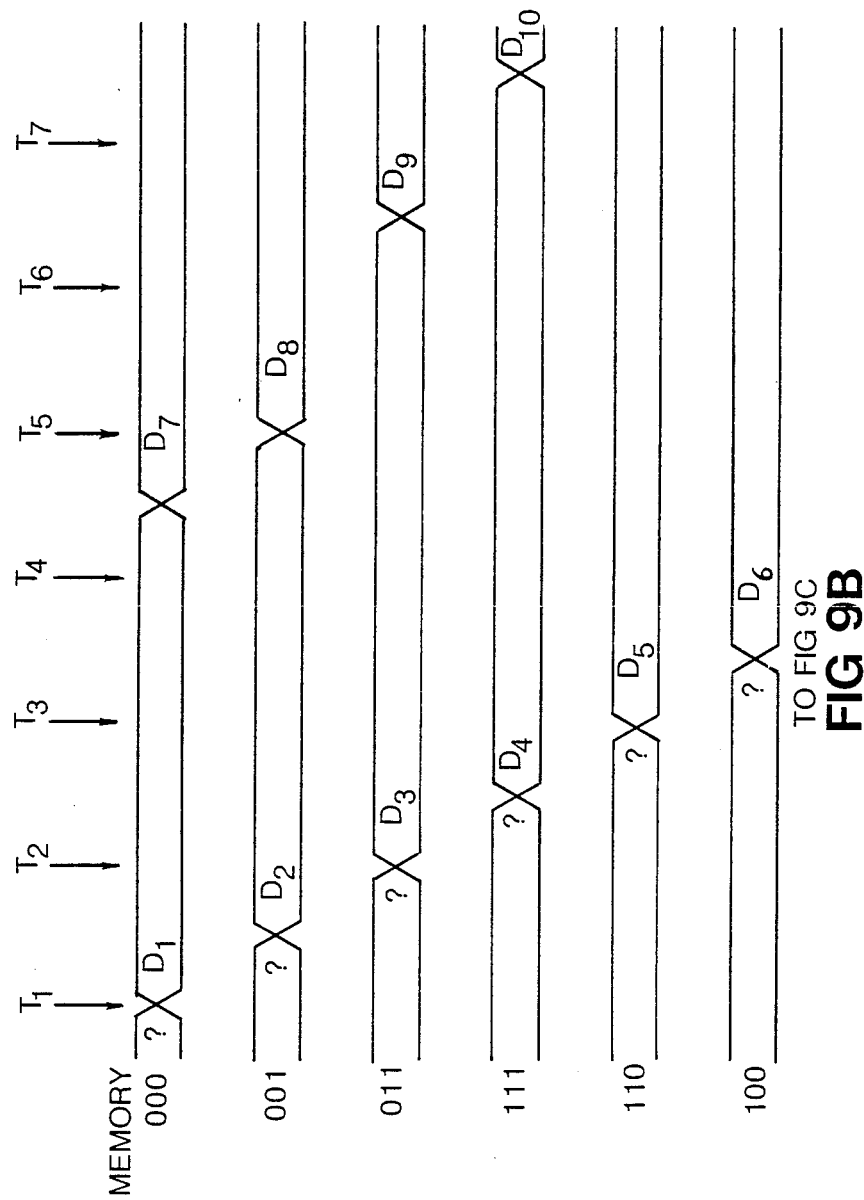
Figure 9C:
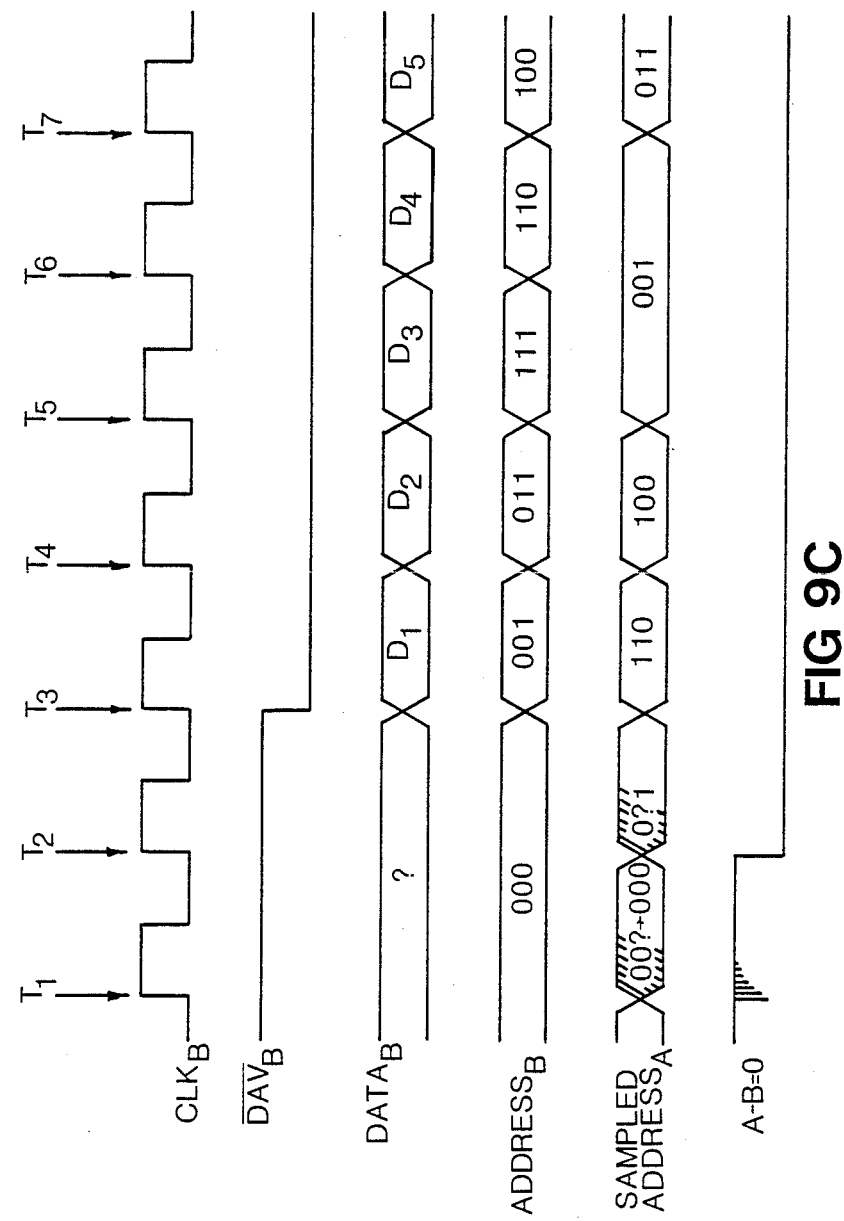
Figure 10A:
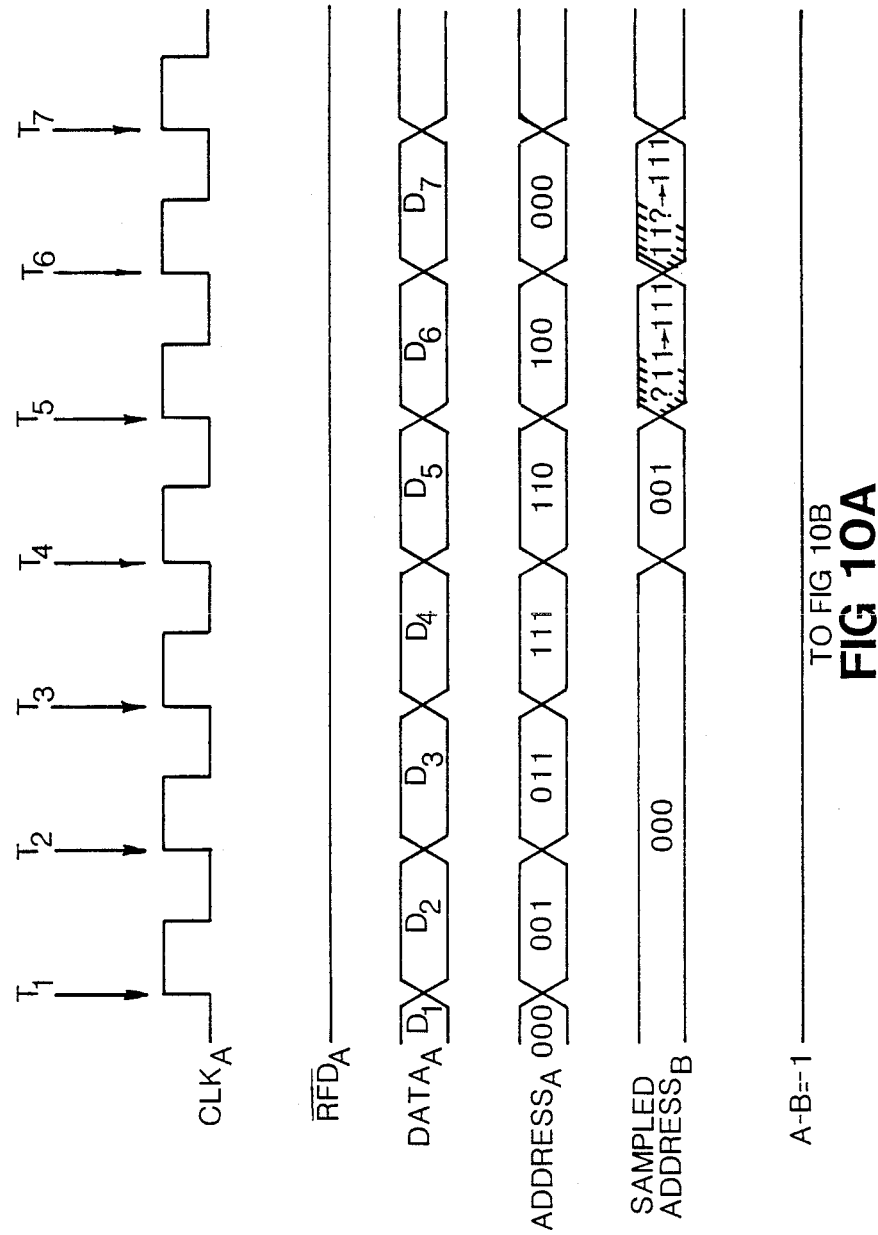

In referring to FIGS. 8A-C, 9A-C and through 10A-C, there may be three cases since the two interfacing clocks are non-correlated. First, FIGS. 8A-C shows that the receiving clock CLK A of the synchronizer system from the system A is slower than the transmitting clock CLK B of the synchronizer system to the system B, namely, the data is sent out of the synchronizer faster than it can be supplied. Second, FIGS. 9A-C shows that the receiving clock CLK A from the system A is faster than the transmitting clock CLK B to the system B, namely, the data would potentially be supplied to the synchronizer faster than it would be taken out. Third, FIGS. 10A-C shows that the receiving clock CLK A from the system A is equal to the transmitting clock CLK B to the system B. In each of these cases the precise details of timing will depend on clock phases and frequencies, so the timing diagrams are representative but not exhaustive. In referring to FIGS. 8A-C, when the data is removed from the synchronizer faster than it is supplied, valid data cannot be sent for each transmitting clock cycle. A handshake line indicates that no data is available, and the value of the data output should be ignored. If constant data is required on the output side, for example, in a communication system, this handshake line can be used to control the generation of idle or dummy characters. However, the synchronizer only indicates the presence or absence of valid data. It does not generate dummy characters in its own logic circuit. In referring to FIGS. 9A-C, when data is supplied to the synchronizer faster than it is taken out, data will accumulate in the synchronizer. To avoid data overflow a handshake line is provided to the data source telling if too much data is being accumulated in the synchronizer. In referring to FIGS. 10A-C, when data is supplied to the synchronizer at the same rate as it is being removed, the entirely synchronous operation through the systems can be performed. After a steady state filling of the two port memory is reached to accommodate the given phase difference between the receiving clock and the transmitting clock, the synchronizer will always be ready for data and it will always have valid data available. Similarly, the synchronizer is capable of receiving information from the data source telling if valid data is sent, and from the sink telling if the sink is ready to accept more data. The operation of the synchronizer is not dependent on the continuity of the clocks, thus it will work with interrupted or varying clock rates as well. The maximum delay from write to read, that is, delay through the synchronizer, is the sum of one receiving clock cycle and one transmitting clock cycle. If N bytes of data were already accumulated in the synchronizer, an additional delay of N transmitting clock cycles are added.

As explained above, the essence of the synchronizing system is that the memory cells in the two port memory are addressed in a unit distance code so that sampling an address during a transition will give as an output either the previous address or the coming address, provided metastable setting is reached in the allowed time period. As a result, in an ambiguous sampling which settles from the metastable state arbitrarily into a valid logic one or zero, the least desirable possibility would be a delay in writing one receiving clock cycle or in reading one transmitting clock cycle. This delaying effect does not accumulate after several consecutively ambiguous samplings based on the unit distance code. It is noted that data is never sampled asynchronously and that the outcome of the asynchronous address sampling is allowed to arbitrarily settle to a logic one or zero state. It is also an important feature of the synchronizing system that the synchronizer is capable of receiving the data from the system A at a first address whose succeeding addresses are encoded in the unit distance code by determining that the two port memory is not full, and is also capable of transmitting the data to the system B from the same address to the first address and the succeeding addresses of the first address by determining that the two port memory is not empty.

A second embodiment is shown in FIG. 11, with signal notations defined as shown in FIG. 11a. In FIG. 11, the signals are labelled with their value during clock n (or m), e.g., the signal labelled RFDw(n+1) has, during clock n, the value that the RFDw variable will have during clock n+1. Signals labelled with an "*" are sampled by the opposite clock domain.

Data is stored temporarily in the data buffer component 201, e.g. an array of N registers (such devices are commercially available, such as the Texas Instruments (TI) LS670). In general, the number of stages required, N, depends on the total number of stages, Nw+Nr, used to synchronize address pointer circuits, i.e. the delay caused by unsynchronized handshake signals. Four data stages are the minimum required to compensate for the use of a single synchronizing flip-flop on each side, i.e., Nw=Nr=1.

The array 201 permits writing into any register via WRITE side address control circuitry 105 of the synchronizer 101 at the same time as a different register is being read via READ side address control circuitry 105' of the synchronizer 101. In the embodiment disclosed, the synchronizer 101 will not be called upon to WRITE and READ from the same location as the system is organized to operate in a FIFO (first in, first out) mode.

Each side address control circuitry of the synchronizer 101 has pointer circuitry 203, 203'. These WRITE and READ pointers are modulo 2N synchronous Gray Code counters. Such devices can be implemented in commercial devices such as the Monolithic Memory Inc.'s (MMI) PAL16R4 (PAL is a registered trademark of MMI). Basically, the pointers keep track of the number of WRITES and READS on their respective sides. These pointer/counters 203, 203' are twice as large as the number of data stages in order to prevent a full synchronizer from appearing to be empty. In an alternative implementation, these counters need only be as large as N+1, if N is odd, or N+2, if N is even, in order to prevent a full synchronizer from appearing to be empty. The Gray Code is necessary because each pointer is sampled by the clock from the opposite side at which time no more than one bit must be in transition.

Included within each pointer circuitry 203, 203' is an "anticipator" component 204, 204'. The anticipator adds the pointer "increment" control input to the current pointer value to anticipate the local pointer value during the next clock period. The addition is in Gray Code.

In order to synchronize (and therefore delay) the pointer from the opposite side clock domain, a cascade of synchronous registers 205, 205', labeled as pointer synchronizers, are provided. Commercially available parts such as the TI LS175 can be used.

Coupled to the pointers 203, 203' and pointer synchronizers 205, 205' are comparators 207, 207'. The comparator component functions can also be implemented in commercially available parts such as the MMI PAL16N8.

The WRITE comparator 207 compares the future value of the WRITE pointer 203 with the WRITE side estimate of the READ pointer 203'. The WRITE comparator 207 asserts RFDin(n+1) whenever, on the next clock, the number of WRITEs does not exceed the number of READs by more than N (viz., there is room available in the array 201). That is, RFDw(n+1) will be true if W(n+1) is less than R*(n)+N. If the WRITE comparator 207 is hazard-free, then Nw periods of CKw are available for synchronizer settling—otherwise only Nw−1 periods are available.

The READ comparator 207' compares the future value of the READ pointer with the READ side estimate of the WRITE pointer and asserts DAVout(m+1) whenever, on the next clock, there will have been more WRITEs than READs (there is data available). That is, DAVr(m+1) will be true if R(m+1) is less than W*(m). Note that the "future value" of DAVr is computed because it will be delayed by one clock period (by the D flip-flop). If the READ comparator 207' is hazard-free, the Nr periods of CKr are available for settling of the synchronizers (otherwise only Nr−1 periods are available).

Coupling the pointer, synchronizer and comparator circuitry to the array 201 are mapping function circuits 209, 209', labelled aliasers. The aliasers 209, 209' alias the second half of the pointer states into the first half. That is, it maps mod(2N) Gray Code into mod(N) Gray Code. Again, a commercial part such as the MMI PAL16N8 can be used. Note that if the pointer were binary, this aliasing would be accomplished by simply ignoring the most significant bit. Thus in the alternative, the aliasers could also be implemented by a binary counter that is incremented by the same signal that increments the Gray Code pointer. Such a scheme is also required when a mod(N+1) or a mod (N+2) counter is used instead of a mod(2N) counter. Note also, that a ring counter could be used instead of a binary counter to provide this aliasing function.

Figure 12:
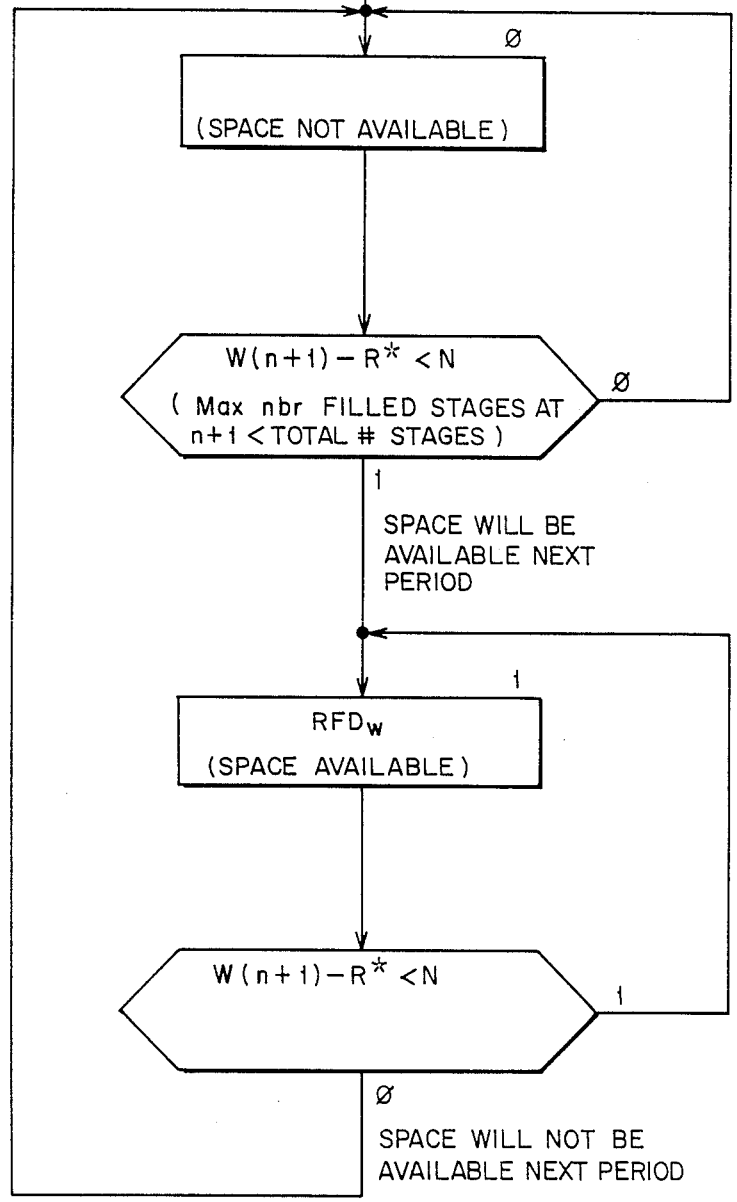
FIG. 12 is a flow chart showing the state machine operation of the WRITE side of the embodiment as shown in FIG. 11.
Figure 13:
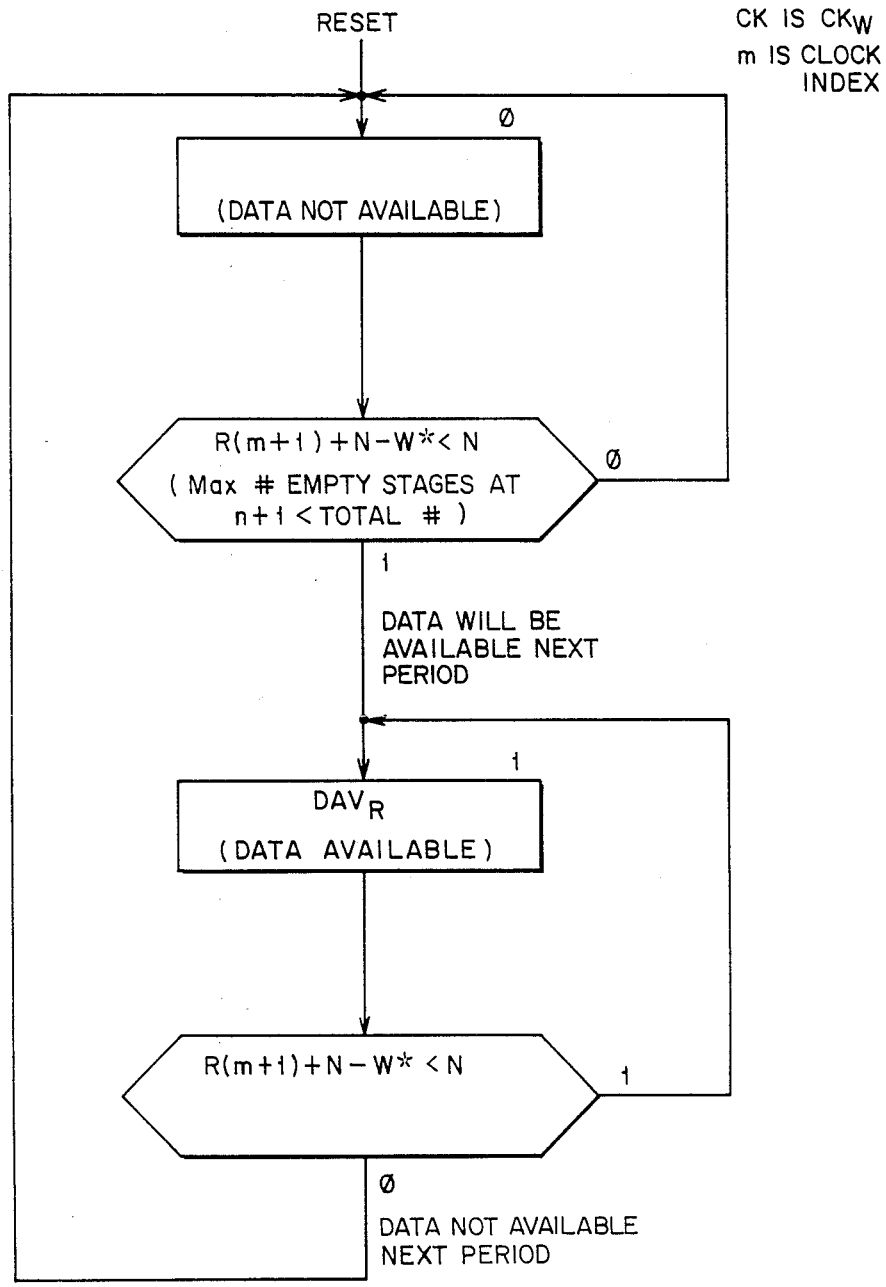
FIG. 13 is a flow chart showing the state machine operation of the READ side of the embodiment as shown in FIG. 11.

In general, the embodiment of FIG. 11 would operate as follows, as shown in FIGS. 12 and 13. Both sides follow the protocol that whenever DAV and RFD are both true, the associated data is transferred during that clock cycle. Otherwise, data is not transferred.

Referring now to FIG. 12, the WRITE side has two states: State 0=space not available 301, and State 1=space available 303. The single state variable used to represent the two states is RFD, Ready For Data status indicator. RFD is de-asserted in State 0 and asserted in State 1. If the state machine is in State 0, it will remain there until the assertion of the WRITE comparator 207 output, indicating that space will be available during the next clock period (space may have been available for some time, but is only now detected in the WRITE clock domain). Upon assertion of the WRITE comparator 207 output, the state machine goes to the State 1. If the state machine is in State 1, it will remain there until the de-assertion of the WRITE comparator 207 output, indicating that space will not be available on the next clock period (the READ clock domain may have removed some data which has made space available, but this condition has not yet been detected in the WRITE clock domain). Upon de-assertion of the WRITE comparator 207 output, the state machine goes to State 0. Note that the state diagram of the WRITE side is simply that of a D flip-flop; i.e., the machine simply delays the output of the WRITE comparator 207 by one clock period.

Thus, when the data source 102 has data available, it asserts DAVw. If there is space in the synchronizer array 201, then RFDw will be true and data will be stored in the register array 201 during that clock cycle; the WRITE pointer will be incremented.

Eventually, the array 201 may fill up and RFDw will be driven false. The WRITE comparator 207 compares the value that the WRITE pointer/counter 203 will have during the next clock period against the synchronized (delayed) value of the READ side READ pointer 203'. Its output will be true as long as the number of WRITEs does not exceed the number of READs by more than N.

The READ side also has two states: State 0=data is not available, and State 1=data is available. The single state variable used to represent the two states is DAV, DAta Valid status indicator. DAV is de-asserted in State 0 and asserted in State 1. If the state machine is in State 0, it will remain there until the assertion of the Read comparator 207' output, indicating that data will be available during the next clock period (data may have ben available for some time but is only now detected in the READ clock domain). Upon assertion of the READ comparator 207' output, the state machine goes to State 1. If the state machine is in State 1, it will remain there until the de-assertion of the READ comparator 207' output, indicating that data will not be available on the next clock period (the WRITE domain may have written new data, but this condition has not yet been detected in the READ clock domain). Upon de-assertion of the READ comparator 207' output, the state machine goes to State 0. Note that the state diagram of the READ side is also simply that of a D flip-flop; i.e., the machine simply delays the output of the READ comparator 207' by one clock period.

Thus, when the data sink 103 is ready for data, it asserts RFDr. If there is data in the synchronizer array 201, then DAVr will be true and data will be read from the register array 201 during that clock cycle; the READ pointer/counter 203 will be incremented. Note that the contents of the register array 201 is not destroyed.

Eventually, the register array 201 will become empty and DAVr will be driven false. The READ comparator 207' compares the value that the READ pointer 203 ' will have during the next clock period against the synchronized value of the other side WRITE pointer 203. Its output will be true as long as the number of READs is less than the number of WRITEs.

In computing RFDw and DAVr, each side uses a delayed version of the other side's pointer. Consequently, its computation of RFDw and DAVr is "pessimistic." This pessimism guarantees that each side is held off early enough to prevent overrun/underrun. The data registers in the array 201 compensate for this by allowing enough time for the pessimism to be either confirmed or disproved. That is, neither side is held off unnecessarily. As long as both sides can keep up with the data, both RFDw and DAVr will remain true continuously in spite of the synchronization delay.

On each handshake, the WRITE side hands over to the READ side all the filled buffers (W−R) it has accumulated since the previous handshake. Similarly, the READ side gives the WRITE side all the buffers (R+N−W) it has emptied since the previous handshake. The time between handshakes depends on the relative clock rates and on the number of synchronization stages.

FIG. 14 shows the timing diagram for the case where the sink is faster than the source. Note that both sides are always ready; Nw=Nr=1; N=4. This corresponds to a minimal synchronizer. The only synchronizing flip-flops are RFDw and DAVr. The comparators must, therefore, have no static hazards. CKr normally misses transitions of the WRITE pointer except where indicated.

FIG. 15 shows the timing diagram where the sink and source are operating at the same speed; Nw=Nr=1; N=4. The sink holds off one cycle; the source holds off one cycle.

The number of synchronization stages on each side, Nr and Nw are picked so as to achieve the desired error rate. Nr and Nw will, in general, be different if the clocks are of different frequency. If N is less than Nw=Nr=2, there will be a hold off for some clock relationships. If N=Nw+Nr+2, there will be no hold off. That is, as long as the sink and source can keep up, there will be no hold off. For most clock relationships, some of the stages act as a FIFO, but there is at least one clock relationship for which all stages are needed just for synchronization. If N is greater than Nw+Nr+2, there will be no hold off and, furthermore, the number of stages in excess of Nw+Nr−2 always serve as a FIFO.

As will be recognized by a person skilled in the art, the present invention thus can also provide synchronization for systems that have an inherent need for independently timed sub-systems, e.g., independently designed systems, computer input/output, serial data communications, storage devices (disk/tape drives), FIFO controllers, dual port rams, multi-processor systems, microprocessors having different clock periods, VLSI circuits, systems with significant skew between internal clocks, and even between systems where one clock is totally discontinuous. Synchronizing the independently clocked systems or subsystems by prior art cascading of flip flops—to lower the probability of unstable outputs—and the inherent delay and corresponding losses in performance involved in such prior art techniques is solved by pipelining the data deeply enough to compensate for the handshake synchronization delay. The data transfer rate is thus rendered independent of the handshake rate.

The foregoing description of the various embodiments of the present invention has been presented for purposes of illustration and description. It is not intended to be exhaustive or to limit the invention to the precise form disclosed. Obviously, many modifications and variations will be apparent to practitioners skilled in this art.

While the invention has been described in terms of block diagrams and commercially available components, it is generally and specifically the intent of the inventors that the invention also can be implemented in integrated circuit form and, more particularly, in a single integrated circuit chip. It is possible that the invention may be practiced in any of the integrated circuit fabrication technologies such as with MOS, bipolar or even BiMOS processes. Similarly, method steps described might be interchangeable with other steps in order to achieve the same result. The embodiment was chosen and described in order to best explain the principles of the invention and its practical application to thereby enable others skilled in the art to understand the invention for various embodiments and with various modifications as are suited to the particular use contemplated. It is intended that the scope of the invention be defined by the claims appended hereto and their equivalents.

We claim:

1. A synchronizing system comprising:
   first system means having data synchronized with a first clock signal;
   second system means having the data to be synchronized with a second clock signal being independent from the first clock signal; and
   synchronizer means coupled to the first and second system means for transferring the data from the first system means to the second system means, the synchronizer means having a two port memory which receives the data from the first system means at a first address whose succeeding addresses are encoded in a unit distance code by determining that the two port memory is not full, and transmits the data to the second system means from the same address to the first address and the succeeding addresses by determining that the two port memory is not empty.

2. A synchronizing system according to claim 1, wherein the synchronizer means consists of a one chip integrated circuit.

3. A synchronizing system according to claim 1, wherein the first clock signal is faster than the second clock signal.

4. A synchronizing system according to claim 1, wherein the first clock signal is the same as the second clock signal.

5. A synchronizing system according to claim 1, wherein the first clock signal is slower than the second clock signal.

6. A synchronizing system according to claim 1, wherein the unit distance code is a Gray code.

7. A synchronizer apparatus for synchronizing the exchange of information between at least two systems having unrelated clock frequencies, comprising:
   storage means for storing data received from one of said systems;
   first address control means for writing said data into said storage means at the clock frequency of said one of said systems; and
   second address control means for reading said data out of said storage means at the clock frequency of the other of said systems.

8. The apparatus as set forth in claim 7, wherein said storage means further comprises;
   an N data stage component, where N is the minimum number of stages necessary to compensate for the use of a synchronizing flip-flop in each of said first and second address control means for each of said systems, respectively.

9. The apparatus as set forth in claim 7, wherein said storage means comprises:
a dual port random access memory circuit.

10. The apparatus as set forth in claim 8, wherein said storage means comprises:
a register array circuit.

11. The apparatus as set forth in claim 10, wherein N=4.

12. The apparatus as set forth in claim 7, wherein said apparatus comprises:
an integrated circuit.

13. A device for pipelining data to compensate for handshake delay caused by the necessity to synchronize of the handshake signals due to a lack of synchronization between a data transmitting system clock and a data receiving system clock, comprising:
a dual port data storage means for holding digital data;
first address control means coupled to said storage means for receiving data from said transmitting system and for writing said data into said storage means via one said port at the clock frequency of said transmitting system; and
second address control means coupled to said storage means for reading said data out of said storage means and for transmitting said data out from the other port of said storage means to said receiving system at the clock frequency of said receiving system.

14. The device as set forth in claim 13, wherein said storage means is a FIFO.

15. The device as set forth in claim 14, wherein said FIFO is a dual-port register array having N stages, where N is the minimum number of stages necessary to compensate for the use of a single synchronizing flip-flop in each of said first and second address control means.

16. The storage means as set forth in claim 14, wherein said device is a dual-port, random access memory component.

17. The device as set forth in claim 14, wherein said first address control means further comprises:
means for encoding addresses succeeding a first address into which data is written in a unit distance code by determining that the storage means is not full.

18. The device as set forth in claim 17 wherein said second address control means further comprises:
means for reading said written data from said first and encoded addresses by determining that said storage device is not empty.

19. The device as set forth in claim 18 wherein said unit distance code is Gray Code.

20. The device as set forth in claim 18 wherein said device is an integrated circuit.

21. The device as set forth in claim 15, wherein N=4.

22. A method for pipelining data to compensate for handshake delay between at least two data terminal equipments, comprising:
receiving data from one of said data terminal equipments at said one of said data terminal equipments' clock frequency for transmitting data;
storing said data in a storage component at a first address;
encoding succeeding addresses to said first address in a unit distance code by determining that said storage component is not filled;
transmitting said data to a second of said data terminal equipments at said second data terminal equipments' clock frequency for receiving data from said storage component by determining that said storage component is not empty.

23. The method as set forth in claim 22, wherein said step of encoding further comprises:
using Gray Code.

24. The method as set forth in claim 23, wherein said step of storing further comprises:
pipelining said data through a storage device having a capacity sufficient to compensate for handshake synchronization delay caused by a difference in clock frequencies of said data terminal equipments.

* * * * *